United States Patent [19]
Cossen et al.

[11] Patent Number: 6,073,058
[45] Date of Patent: Jun. 6, 2000

[54] COMPUTER GENERATED GRAPHIC DEPICTION OF MANUAL MACHINING OPERATIONS

[76] Inventors: Edward J Cossen, 3046 Inn Rd., Columbus, Ohio 43232; Daryll E Moravek, 2755 Blacklick Rd., Baltimore, Ohio 43105-9634

[21] Appl. No.: 08/971,240

[22] Filed: Nov. 15, 1997

[51] Int. Cl.[7] .................................................. G05B 19/00
[52] U.S. Cl. ........................................... 700/184; 700/182
[58] Field of Search ............................. 700/83, 180, 184, 700/182

[56] References Cited

U.S. PATENT DOCUMENTS

| | | | |
|---|---|---|---|
| 3,942,895 | 3/1976 | Meyer et al. | 356/373 |
| 4,100,485 | 7/1978 | Rogers | 324/207.17 |
| 4,103,222 | 7/1978 | Phillips et al. | 324/207.12 |
| 4,477,754 | 10/1984 | Roch et al. | 318/568.1 |
| 4,510,566 | 4/1985 | Gordon | 364/190 |
| 4,575,791 | 3/1986 | Schwefel | 700/161 |
| 5,278,479 | 1/1994 | Seki et al. | 318/568.25 |
| 5,315,523 | 5/1994 | Fujita et al. | 364/474.22 |
| 5,377,116 | 12/1994 | Wayne et al. | 364/474.17 |
| 5,521,829 | 5/1996 | Jeon | 700/184 |
| 5,663,886 | 9/1997 | Lueck | 364/474.22 |
| 5,831,407 | 11/1998 | Ouchi et al. | 364/474.26 |
| 5,862,056 | 1/1999 | Iwata et al. | 364/474.26 |
| 5,877,961 | 3/1999 | Moore | 364/474.22 |
| 5,923,560 | 7/1999 | Ozaki et al. | 364/474.17 |

OTHER PUBLICATIONS

TekSoft, Inc., "TekSoft CAD/CAM", 1994, Marketing Brochure, Phoenix, Arizona.

Heidenhaim Corp., "General Catalog", Sep. 1996, p.p. 30–31, Germany.

*Primary Examiner*—William Grant
*Assistant Examiner*—Kidest Bahta

[57] ABSTRACT

A computer generated graphical position readout device for manually operated milling machines, drill presses, boring machines, lathes, and the like. The readout apparatus includes a means to convert machining requirements into a graphical form, called a pattern, and to display the current and past positions of a milling machine's cutting tool with respect to this pattern. The readout device includes a means to display graphical information, a computer with a keyboard for operator provided data input and control of the operational program, and a position monitoring system to provide relative position information of the machine's cutting tool to a workpiece in multiple axes. The readout device further provides cross-hair type target displays to augment the graphical display for positioning the cutting tool center to a point, or to follow a curved or diagonal line. The machine operator is thus provided with a display of the machining requirements and the current state of machining including a representation of the material removed from the workpiece.

4 Claims, 13 Drawing Sheets

Microfiche Appendix Included
(2 Microfiche, 146 Pages)

COMPUTER GENERATED GRAPHIC DEPICTION OF MANUAL MACHINING OPERATIONS

MICROFICHE APPENDIX

This application includes a microfiche appendix having two frames.

BACKGROUND

1. Field of Invention

This invention relates to the operation of manual machine tools such as milling machines, drill presses, boring machines, and lathes; specifically to the presentation of machining requirements and operator guidance information in graphic or pictorial form on a computer display.

2. Description of Prior Art

Manually operated machine tools such as mills, lathes, boring machines, and the like are typically equipped with calibrated lead screw dials to position the cutting tool in relation to the work. Digital readout devices, which display a numerical indication of the current cutting tool position relative to the work in one or more axes, are often retrofitted to or are provided as standard equipment on such machines. For digital readout devices the position information is typically obtained from mechanical or electrical rotary or linear encoders or scales (such as those disclosed in U.S. Pat. No. 3,942,895; No. 4,103,222; and No. 4,100,485). The machine operator uses the positioning information from lead screw dials or digital readout devices to position and move either the cutting tool or material to perform machining operations.

Typically, the machining requirements are defined by part drawings and show the end results of machining operations. The operator must visualize the requirements and frequently refer to a defining document to assure compliance. A defining document rarely provides information about sequences of operations needed to make a part. For complex parts this process often results in extended processing time requirements, errors and high cost, especially when required quantities are low. The experience level of an operator usually needs to be high when making complex parts.

Improvements in digital readout devices have included the ability to program the devices with a sequence of numbers representing a sequence of tool positions related to the information specified in the requirements for the machined part. Programming aids, such as the automatic generation of the numeric data for standard patterns (i.e. bolt holes patterns), have improved programming and reduced errors, These improvements still require that the machine operator relate the digital readout display to the actual cutting movement of the tool. Operations such as those required for bulk material removal or for following a curved path remain very tedious, inaccurate, and error prone. There have been specific improvements to ease the workload on the operator (such as that disclosed in U.S. Pat. No. 4,510, 566 ) but these still require the operator to visualize and remember the relation of the tool cutting movements to the overall requirements for the part.

References Cited:

U.S. Pat. No. 3,942,895
    Linear digital readout assembly for milling machines and th e like and means of monitoring same. Teledyne Industries. 356/373 33/707 356/395

U.S. Pat. Nos. 4,103,222/4,100,485
    Newall Eng. LTD Jul. 7, 1978. 324/207.17 324/207.22

U.S. Pat. No. 4,510,566
    Machine Tool Readout with Automatic Cutter Radius Offset. 364/190 73/660 318/572 340/679 340/680 364/474.18 408/13

OBJECTS AND ADVANTAGES

The primary objects of the invention are to provide users of manually operated machine tools a means to make better use of a machine tool by performing non-precision tasks visually and combining the visual methods with improved precision methods. Aspects of the primary objects and their advantages are described below.

1. Visualization

The machined part requirements visualization and real-time visual feedback provided by Computer Generated Graphic Depiction (CGGD) is more natural for the operator than numerical information displays. A more natural operator interface leads to fewer mistakes and unusable parts. Operator fatigue is reduced by visual processing, particularly when required machined shapes are complex.

2. Flexibility

Modifications can be made to existing patterns to satisfy new requirements without having to completely reprogram the patten. Multiple pattern files can thus be created that capture these variations in requirements. This often happens as parts are prototyped and requirements change.

3. Efficiency

The invention provides a convenient way to encapsulate the information needed to make a part, make the information available at multiple locations without the need for multiple shop copies of printed documents and help provide a systematic way to record and process the information. It provides increased support for less experienced operators by codifying the knowledge gained by others in the efficient processing of particular parts. This knowledge is reflected in modifications made to the pattern file to provide the most efficient sequence of operations and the inclusion of appropriate operator guidance notes associated with the machining step in the form of comment information in the step line text.

4. Safety

The CGGD display shows all required information at a position convenient for the operator while in a position to manually operate the machine. The need for clearing chips generated by the material removal process is greatly reduced thereby allowing the operator to work clear of moving tools and ejected material. Chip shields may be used more effectively when there is less need to clear chips behind them.

5. Consistency

Inconsistencies, resulting from different machining sequences used by different operators, are reduced.

6. Allow for profiling and angle cut operations

Manual milling machines are poorly equipped to profile a curved line such as an arc or even follow a diagonal cut requirement without additional equipment such as a rotary table or repositioning the work. Even with a rotary table (a device to allow the workpiece to be rotated around a center) it may not be possible to mount the workpiece to the rotary table and swing the required amount. If the accuracy and/or surface finish requirements allow, many contouring and diagonal cut requirements can be accomplished using careful application of visual processes to approximate the shape required. For more precision the Arc Target and Angle Target features may be used. If profiling is done visually, the degree to which the result matches the specification is in direct proportion to the magnification used for display of a contour, the time taken to conform to a contour and the skill of the operator. If the Arc and Angle Target features are used, the final accuracy is determined by the precision with which the operator uses the target display.

7. Allow for Size Scaling

Size scaling is utilized when the object to be produced (typically a part) is smaller or larger than indicated in the full size documentation, in this case the pattern file text. The operator sets the display system scaling factor such that physical movements are translated to the values required to produce the scaled part. The visual display seen by the operator is no different than that seen when making a normal size part. This relieves the operator from making repetitions calculations to translate actual movements to scaled movements needed to make a scaled part.

Drawing Figures

| Fig. | Description |
| --- | --- |
| 1. | Milling Machine with Graphic Display |
| 2. | Linear Scale Signal Description |
| 3. | Example of Pattern Graphic Printout |
| 4. | Encoder Interface Block Diagram |
| 5A, B, C | Position Sub-System Flow Chart |
| 6. | Command Mode Screen |
| 7A. | Milling Mode Screen |
| 7B. | Milling Mode Screen showing machined area |
| 8A. | Target box (blank) |
| 8B. | Target box when within 0.01" of target position |
| 8C. | Target box when Arc tracing |
| 8D. | Target with Angle tracing |
| 9. | Speed box |
| 10. | DRO box |
| 11. | Tool motion for a lathe application |
| 12. | Lathe application visual display |

List of Reference Numerals

| No. | Description |
| --- | --- |
| 1 | vertical milling machine |
| 2 | graphic display cabinet |
| 3 | X-linear scale |
| 4 | Y-linear scale |
| 5 | Z-linear scale |
| 7 | attachment knob (left) |
| 8 | attachment knob (right) |
| 9 | mounting arm |
| 10 | mounting bolt |
| 11 | keyboard cable |
| 12 | keyboard |
| 13 | mill table |
| 14 | Z-scale cable |
| 15 | X-scale cable |
| 16 | Y-scale cable |
| 17 | signal level at a linear position |
| 18 | scale A signal |
| 19 | scale B signal |
| 20 | scale read head |
| 21 | secondary position subsystem |
| 23 | mounting bracket |
| 30 | microprocessor |
| 31 | non-volatile memory |
| 32 | address/data bus |
| 33 | address latch |
| 34 | quadrature counter (ch-1) |
| 35 | quadrature counter (ch-2) |
| 36 | control bus |
| 37 | buffered clock line |
| 38 | signal conditioning block (ch-1) |

-continued

List of Reference Numerals

| No. | Description |
| --- | --- |
| 39 | signal conditioning block (ch-2) |
| 40 | position signal input points |
| 41 | serial communication buffer |
| 42 | external serial communication signals |
| 43 | serial input connection |
| 44 | serial output connection |
| 45 | optical isolation block |
| 46 | device decoding block |
| 47 | read line for non-volatile memory |
| 48 | read line for ch-1 quadrature counter |
| 49 | read line for ch-2 quadrature counter |
| 50 | address bus |
| 51 | ALE (Address Latch Enable) line |
| 52 | crystal |
| 61–104 | Flow chart block references |
| 120 | File Command |
| 121 | Mill Command |
| 122 | Color Command |
| 123 | Tool Command |
| 124 | View Command |
| 125 | Help Command |
| 126 | GRO Command |
| 127 | Quit Command |
| 128 | Units indicator |
| 129 | Tool diameter indicator |
| 130 | Tool position indicator |
| 131 | Screen resolution indicator |
| 132–139 | Tool path end-locations |
| 140, 141 | isolated features |
| 142 | edge of tool path |
| 143 | center of tool path |
| 150 | Tool command - milling |
| 151 | Up tool command - milling |
| 152 | Down tool command - milling |
| 153 | Color command - milling |
| 154 | Refresh command - milling |
| 155 | Help command - milling |
| 156 | New command - milling |
| 157 | Units switching command |
| 158 | Level switching command |
| 159 | Velocity command |
| 160 | Exit milling command |
| 161 | Tool size - milling |
| 162 | Tool position - milling |
| 163 | Target box |
| 164 | Speed box |
| 165 | DRO data box |
| 166 | Screen resolution - milling |
| 167 | example pattern |
| 168 | Tool path indicator - tool up |
| 169 | Tool path - tool cutting |
| 171 | cross-hair style target |
| 172 | tool location indicator |
| 180 | Speed box |
| 190 | DRO data box |
| 191 | X-position |
| 192 | Y-position |
| 193 | Z-position |
| 194 | Step number indicator |
| 200 | rotating workpiece |
| 201 | center of turning |
| 202 | tool indicator |
| 203 | compound feed arrangement |
| 204 | machined area |
| 205 | tool reference path |

SUMMARY

Computer Generated Graphic Depiction (CGGD) provides a graphic presentation of machining requirements, a method to create the data used for displaying the requirements, and visual assistance for the operator of a manually operated machine tool in the production of machined parts by using the graphic displays to operate the machine tool.

DESCRIPTION

The purpose of a Computer Generated Graphic Depiction (CGGD) equipped machine is to produce machined parts using computer generated graphic displays to show a visual representation of the machining requirements, or specifications, describing a part and show graphically a representation of the machining actions as they are performed. Also, the CGGD methods provide for information transfer in the form of short messages written on the display screen related to a current machining operation.

A part is typically formed from solid block stock material such as metal, and shaped by various machines such as drill presses, milling machines, lathes and the like. Prior to the invention of the CGGD methods, a machine operator would typically be supplied with a drawing or print of work to be accomplished. The operator then uses his/her best judgement and experience, or written instructions, to determine the tools and operations needed to process the bulk material into the specified part. A typical machine, say a milling machine, moves a work table (to which the workpiece is attached) in relation to a rigidly positioned rotating tool to effect the tool to workpiece movements required. Lead screws are typically used to move the table in each axis of movement. A handle is provided to turn the lead screw for operator control. Currently, machines are often equipped with digital displays, often called digital readout (DRO) devices to help the operator keep track of the position, typically, of a cutting tool in relation to the workpiece. These devices have utility over machine mounted lead screws with calibrated dials for tool positioning because of their ability to track large distances instead of the typical lead screw dial which shows only divisions of one revolution. DROs also eliminate the problem of lead screw backlash compensation because of the nature of the measurement scale construction and its attachment directly to the work table rather than the lead screw. Backlash in a lead screw is the effect where the initial reversal of turning direction does not correspond to physical movement reversal until the lead screw backlash is taken up. The possibility of different amounts of backlash over the lead screw length further complicates the tool position tracking problem using lead screw dials. DROs have been enhanced over the years with a variety of convenience features but are fundamentally limited in their ability to improve operator visualization of the work to be performed and the status of operations in progress.

Computer numerical control (CNC) equipped machines exist in many variations and have not needed to display the workpiece requirements and machining progress. With CNC equipped machines the specifications and the sequence of operations for making a part are encoded in a program, machine movements are controlled by the CNC device and operator involvement is restricted to functions not controlled by the program.

CGGD Methods

Computer generated graphic depiction (CGGD) in relation to machine tools is characterized by the following general concepts:

1. A method to translate machining requirements to a form useable by a computer and display process The machining requirements may originally be in any suitable form including spoken descriptions, written text, sketches, drawings, blueprints, Computer Aided Design (CAD) drawings and the like. The original requirements are systematically converted to a text document, and equivalent computer file, of a predefined format which is human readable and, in the form of the equivalent computer file, can be processed by the CGGD computer. The format consists of a sequenced set of operations and comments. When later processed by the CGGD device, the requirements are converted to a graphical visual display and the operation sequence and comments entered into the text are presented at the appropriate steps in the sequence. The construction of a sequenced set of machining requirements, using the format to be described, then becomes a procedure by which the machining requirements are converted to, typically, text based data stored in a computer file.

2. An idealized, scaled abstraction of machining requirements displayed graphically The machining requirements display is made up from a set of easily recognizable graphical elements including circles, lines and arcs. The graphic elements are combined in a systematic way to depict the essential requirements. For example, the circle is used to represent a circular change in surface feature including a drilled hole, a bored hole, a circular milled recess, a counterbore, a circular raised feature made by removal of surrounding material, or the outside diameter of a countersink. A circle picture element is thus used to identify an abstract requirement and needs additional information to resolve its specific meaning. The additional information can be programmed as a comment associated with a sequential step which deals with the circle. Alternatively, the meaning may be known to the operator through knowledge of the part or other information such as drawings. A comment associated with the sequential step is the preferred method because the information is preserved for other users and the comment information is displayed when the machining sequence advances to the associated step.

3. A sequential order or set of steps to follow for machining a work piece

A wide variety of operator controlled preferences may exist regarding the machining order. For example, some operators may prefer to drill all of the smallest holes of a given size first, then all holes of the next size, etc. The CGGD method does not dictate any specific order of operations but allows for the order to be altered through an editing process as more experience is gathered making a part. Generally, some machining order will be optimal given a particular set of circumstances. The CGGD method allows for as much optimization as is justified by the situation and experience of the operator.

4. A graphical method to indicate the end position for the current operation

The current operation may require only repositioning the current tool to a new position. Alternatively, the current operation may be to mill to the next location. In either case, the graphical identifier shows the end point position for the operation. In this embodiment the end point identifier is a small filled yellow circle superimposed over the machining requirements pattern and centered at the current step end point. As stepping occurs from one operation to the next the end point identifier is moved to reflect the current end point position.

5. A method to indicate the current tool position graphically and show tool movement history Two basic tool indications are required to satisfy the CGGD requirements. A tool-up movement display shows where the current tool center is and has been while movement occurs without tool contact with the workpiece. In the current embodiment, this tool indication is a single pixel white dot written to the graphic display at a position accurately showing the tool center relative to the machining requirements display. Tool movement is traced by a series of white dot position indications which generally merge to a white line or series of closely spaced dots. The CGGD tool-down tool display shows the current position and movement history for operations where the tool is cutting or in contact with the workpiece. Although a variety of tool geometries are possible, in this embodiment the tool-down tool display is shown as a filled circle to represent the cutting area of a rotating milling machine tool. The tool display color is user selected to allow for the depiction of cutting planes of various depths which may or may not overlap. The tool path history thus accurately represents, in a symbolic way, the actual material removed from the workpiece. The visual effect is a real-time symbolic moving representation of machining operations without the troublesome real world visual impediments including off-axis viewing; the work area obscured by removed material, lubricants and/or coolants; inadequate lighting and the like. Also, since the machining requirements are symbolically represented on the display screen, there is no need to mark the work by scribing lines or using punch marks as is often done.

6. A method to allow for the creation, storage and use of a library of user defined machining requirements Typically a library of machining requirements is created to specify groups of machining requirements that have some general application, either multiply on a primary or base machining requirement set, or in conjunction with a variety of base machining requirement sets. For example, the machining requirements of a workpiece can contain groups of details which are repeated at different locations and/or angles. Group details can be created and stored using the same methods for any other set of machining requirements. The main workpiece machining requirements then need only specify a reference location for the insertion of a specific detail. This reduces the effort needed to create the main workpiece requirements and ensures consistency of details by eliminating the repetitious processing of repeated details, particularly if the details need to be introduced at different degrees of rotation.

CGGD Machining Requirements Text

Each complete descriptive text is saved as a computer file and when loaded by the embodiment program is the basis for the machining requirements graphic display. The preferred embodiment uses a descriptive text format made from eight distinct line types. Each line type is used to satisfy one or more functions. Spaces are used to separate information fields within a line. Except for a comment field, which is always the last field on a line, no spaces may be present within a field. Multiple spaces may be used between fields but serve no operational function. Comments are preceded by a semicolon, typically contain written messages with spaces, and are considered to be one literal field. The line type name, associated functions, and options are described below:

| Line Type Name | Function |
| --- | --- |
| Millimeter line | Used to indicate that all numerical data in the text is expressed in millimeters. The default for numerical information is inches if no millimeter line exists. The millimeter line may appear anywhere in the text prior to an optional "End of Text" line.<br>Example: mm ;optional comment |
| Text Comment line | A text comment line is used to write comments into the text document. These comments are not passed on as machining information comments but serve as a method to provide additional information about the text document. A text comment line must have a semicolon (;) as the first non-space character on a line.<br>Example ;this is a text comment line. |
| Blank line | A blank line is used to vertically separate text as desired. A blank line (line without any characters or containing only space characters) has no operational function. |
| Step line | A step line is used to specify a point representing the center position of a tool. This is the main line type used to create machining requirements. An integer line number is required beginning with 1 and increasing by 1 for each step line. The line number is used to identifier the machining step number. (In this embodiment the maximum step number is 99. More than 99 steps may be implemented in other embodiments but the 99 step limit is designed to limit screen clutter. Other arrangements are indicated below to allow for a practical method for work requiring more than 99 steps.) A step line must identify a point, thus at least one absolute or relative axis point must be included on the line. The point identification. is written in the form: axis identifier, optional relative displacement indicator, =, value. The axis identifiers in this embodiment are X, x, Y, y, Z, z. The relative displacement indicator is I or i (i for incremental). Thus, xi=2 means from the previous x point move an incremental value of 2. The value part may be an expression using operators, numeric values and defined variables. If a new axis point is not defined on a step line, its current value is taken to be the value from the last preceding step line having a value for that axis. A connect field may be included after all axis identification fields to connect the currently defined point with the last previously defined point. A comment field may be included as the last field.<br>Examples: 1 x=0 y=0 z=0   ;absolute reference point<br>        2 xi=1   c ;connect x relative point to prev x pt<br>        3   y=(3+4)/(7−3) ;y pt defined by expression<br>        4   z=−.5 |
| Arc line | An arc line is used to specify an arc. The form is: line number, arc |

-continued

| Line Type Name | Function |
|---|---|
| | identification character, arc start angle, arc stop angle, arc radius. The arc identification character is "a" or "A". The arc angles are expressed in degrees and the radius is expressed in the measurement unit being used (inches or millimeters). The arc is expressed counterclockwise from the start angle to the stop angle. The arc center point is the current point or tool position established prior to the arc line. The arc angles must be in the range of +/−360. A comment field may be included but is not written to the screen.<br>Examples:  5   a   25.74  179.7  3    ;arc from 25.74 to 179.7 radius 3<br>          6   A   0      360   10   ;complete circle radius 10 |
| Set Variable line | A set variable line is used to set the general purpose variables g and h. A step number is not used with this line type. The g and h variable definitions may also be imbedded into a step line.<br>Examples:  g=24/3<br>          h=17<br>          15 x=3 y=7 g=24/3 h=17 |
| Tool Size line | A tool size line, similar the Set Variable line type, is used to specify the "t" or "T" variable for a new tool diameter size. The tool size value applies for all lines following until another tool size is specified. A step number is not used with this line type. A comment field may be included but is not written to the screen. As an alternative to using the Tool Size line type, a tool size field may be imbedded in a Step line type and is effective for that line and after until changed:<br>Examples:  t=0.5 ;optional comment<br>          7 x=3 ; comment written to screen<br>          8 x=3.75 y=4.5 t=.25 ;imbedded tool change on step line |
| End of Text line | An end of text line is used to define the end of operational text. The end of text mark is an exclamation point character (!) and must be the first character on the line. Any text after the exclamation point is not processed by the system software and therefore can have any desired form such as a paragraph of descriptive text.<br>Example:  ! Any text after the (!) is ignored and can be<br>          used to describe the file or whatever else is needed in<br>          free text form. |

Options Associated with a Value

In the preferred embodiment CGGD machining requirements text, there are numerous places where a value is needed. For example, the field X=10.375 identifies the X axis absolute value of 10.375 units. The value may be expressed as a decimal number, expression, defined variable or a combination of these. Expressions may use parenthesis to group quantities for clarity and use the operators * for multiplication,/for division, + for addition and − for subtraction or negation. The standard mathematical precedence of multiplication and division, and then addition and subtraction is used and any quantity within parentheses is evaluated prior to the application of the precedence rules. For example: The expression (3+4)/(4−2) is resolved to 3.5 by resolving the quantities within the parentheses before the division operation. The expression 3+4/4−2 will resolves to 2 because the division is done first. The variable t is used to set the tool diameter, for example t=0.5, and may be used in expressions, for example (3+t)/4. The variables r and d are used to express the current tool radius and tool diameter respectively and are always equal to t/2 and t respectively. Thus a field X=27.5−d resolves to a number dependent on the current tool diameter. General purpose variables g and h can be assigned values and used for convenience in expressions.

Example of a Simple Pattern Program:

(See FIG. 3 for a printout of this example pattern file in graphic form)

; introductory comment for description, file name identification, etc.

; make a simple 3"×2" pocket by clearing interior first, then follow steps 1–8 for trim cuts

```
1 x=0         y=0      z=0      ;set 0,0,0 point
  t=0.500                        ;set tool for 0.5"
2 x=0.25      y=0.25            ;move to start position
3                      z=−.25    ;move tool down .25"
4 x=2.75                      c  ;move tool to x 2.75" connect
5             y=1.75          c  ;move tool toy y 1.75" connect
6 x=0.25                      c  ;move tool to x 0.25" connect
7             y=0.25          c  ;move tool to y=0.25" connect
8                      z=0      ;move tool up
```

! optional free form text to describe part, etc

Tool Compensation

An important element of the machining description language is the ability to provide tool compensation. In the preceding example no tool compensation was used and therefore if the tool size is changed the overall size of the pocket changes. The writer had to compute the tool positions by adding or subtracting the tool radius value to the tool positions specified in order to obtain the desired outside dimensions. Since all points identified by a step line refer to the tool center position and since the radius variable r can be used in the identification of a point, then the tool center can be offset by the tool radius. Thus, a pocket or other feature's size may be written in a form that is independent of the tool size, except for the finished corner radius. The previous pocket description is modified below for tool compensation.

Example of a pattern file using tool compensation:

; introductory comment for description, file name identification, etc.

; make a tool compensated 3"×2" pocket by clearing interior first, then follow steps 1–7 for trim

```
1 x=0    y=0    z=0      ;set 0,0,0 point
t=0.500                   ;set tool for 0.5"
2 x=r    y=r             ;move to starting point
2               z=-.25    ;move tool down .25"
3 x=3-r                c ;move tool to x 3" connected to prev point
4        y=2-r         c ;move tool to y 2" connected
5 x=r                  c ;move tool to x 0" connected
6        y=r           c ;move tool to y=0" connected
7               z=0      ;move tool up
```

! optional free form text to describe part, etc

DESCRIPTION OF THE PREFERRED EMBODIMENT

Figure 1:
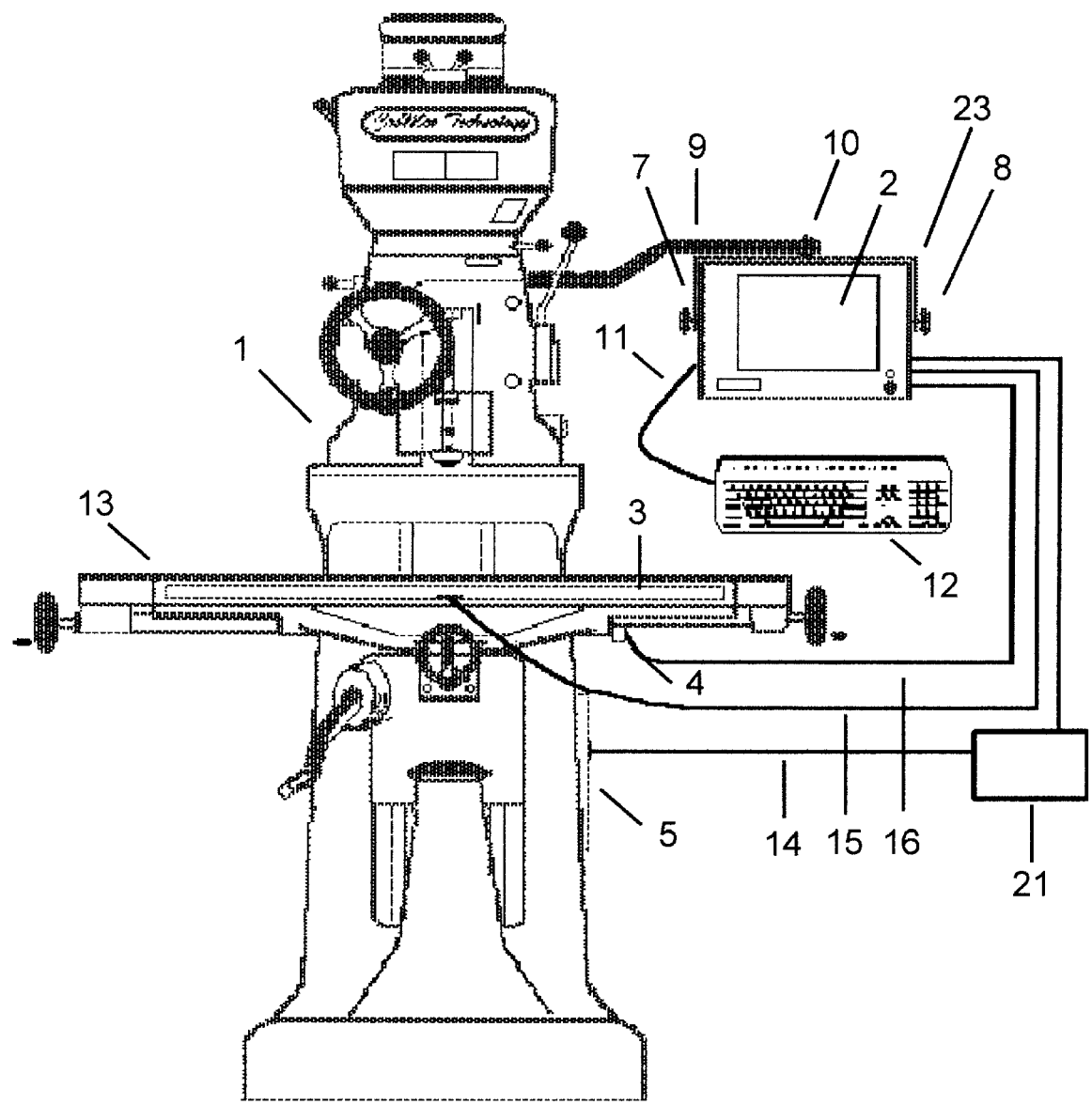

For the purposes of promoting an understanding of the principles of the invention, reference will be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to FIG. 1, there is shown a typical vertical milling machine 1 with a graphic display cabinet 2 and linear position encoders 3, 4, 5 adapted for operation therewith. Cabinet 2 contains the electronic hardware for a computer and display system and is mounted on bracket 6 with attachment knobs 7 and 8. Bracket 6 is connected to mounting arm 9 by bolt 10. Mounting arm 9 is connected to the milling machine 1 with a bolt into an existing threaded hole (not shown) or like mechanical arrangement. The combination of swivel adjustments using attachment knobs 7 and 8, bolt 10, and connection to milling machine allow the cabinet 2 to be positioned for convenient viewing by the operator in the normal operator position at the front right side of the milling machine. In addition, mounting arm 9 may be inverted so the built in offset may extend downward instead of upward as shown. This, in combination with the ability to mount the cabinet 2 with bracket 6 above or below cabinet 2 using bolt 10 allows for one of four vertical height positions to be selected to suit the operator. Keyboard 12 may be attached above or below cabinet 2 (attachment brackets not shown) or may be detached for the convenience of the operator. Keyboard 12 is connected to cabinet 2 with cable 11.

Figure 2:
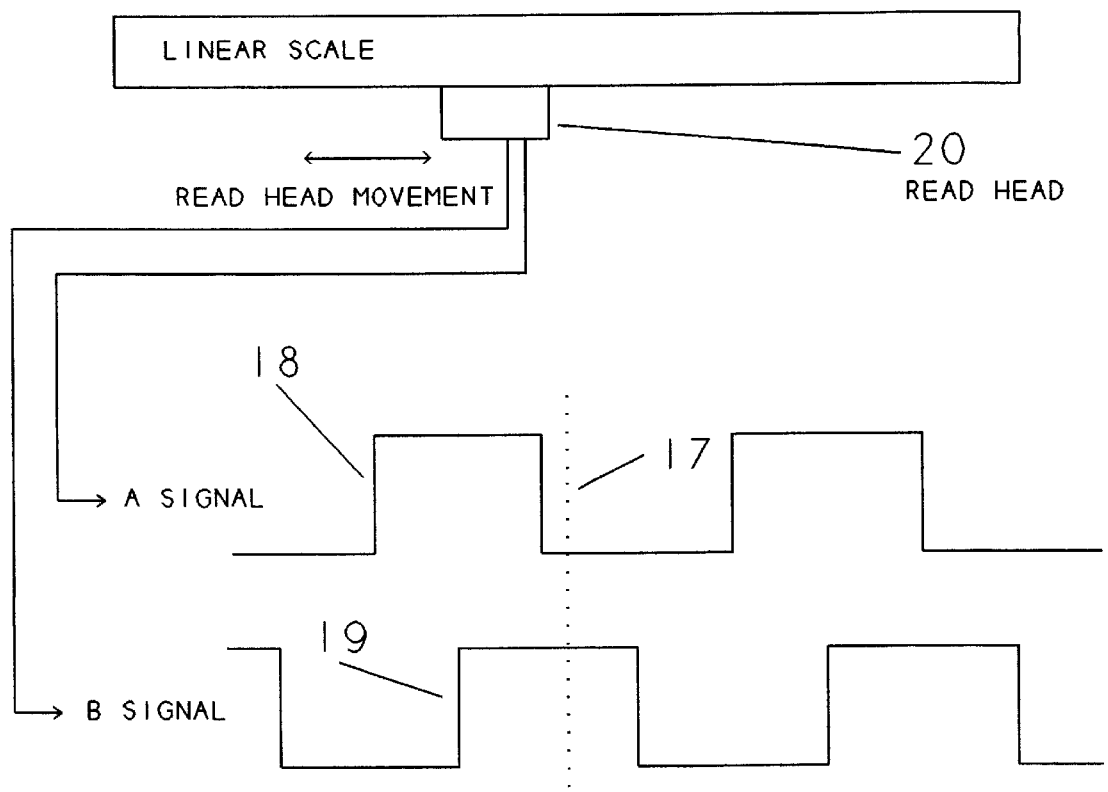
Figure 3:
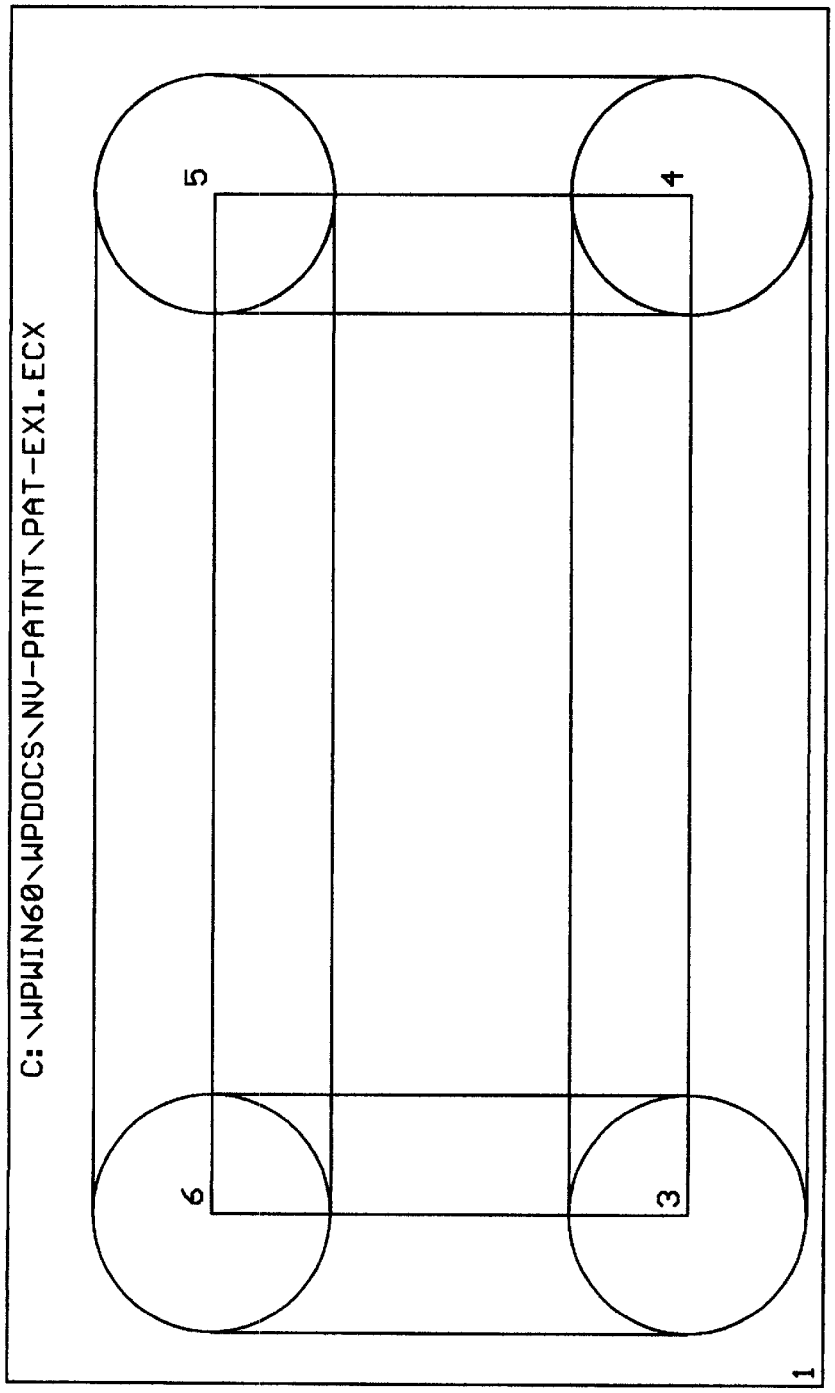

Linear scales 3 and 4, connected to cabinet 2 with cables 14 and 15 respectively, detect movement of the mill table 13 along the X and Y axes respectively. Cables 14 and 15 connect the linear scales 3 and 4 to a position sub-system, discussed below, located within cabinet 2. In this embodiment the Z axis is provided as an add on option. Thus, linear scale 5, if installed, detects movement of the mill table along the Z axis and is connected to an additional and externally mounted position sub-system box 21 with cable 16. The output from the externally mounted position sub-system box 21 is then connected to cabinet 2. Output signals 18 and 19 from each scale are shown in FIG. 2. In this particular scale type, signals 18 and 19 are either high or low level. Electrical signal 18 and signal 19 remain approximately 90 degrees out of phase as movement occurs. The output levels obtained for a particular linear position are indicated by dashed line 17. External circuitry reads the scale signals 18 and 19 and can determine from them the amount and direction of movement.

Figure 4:
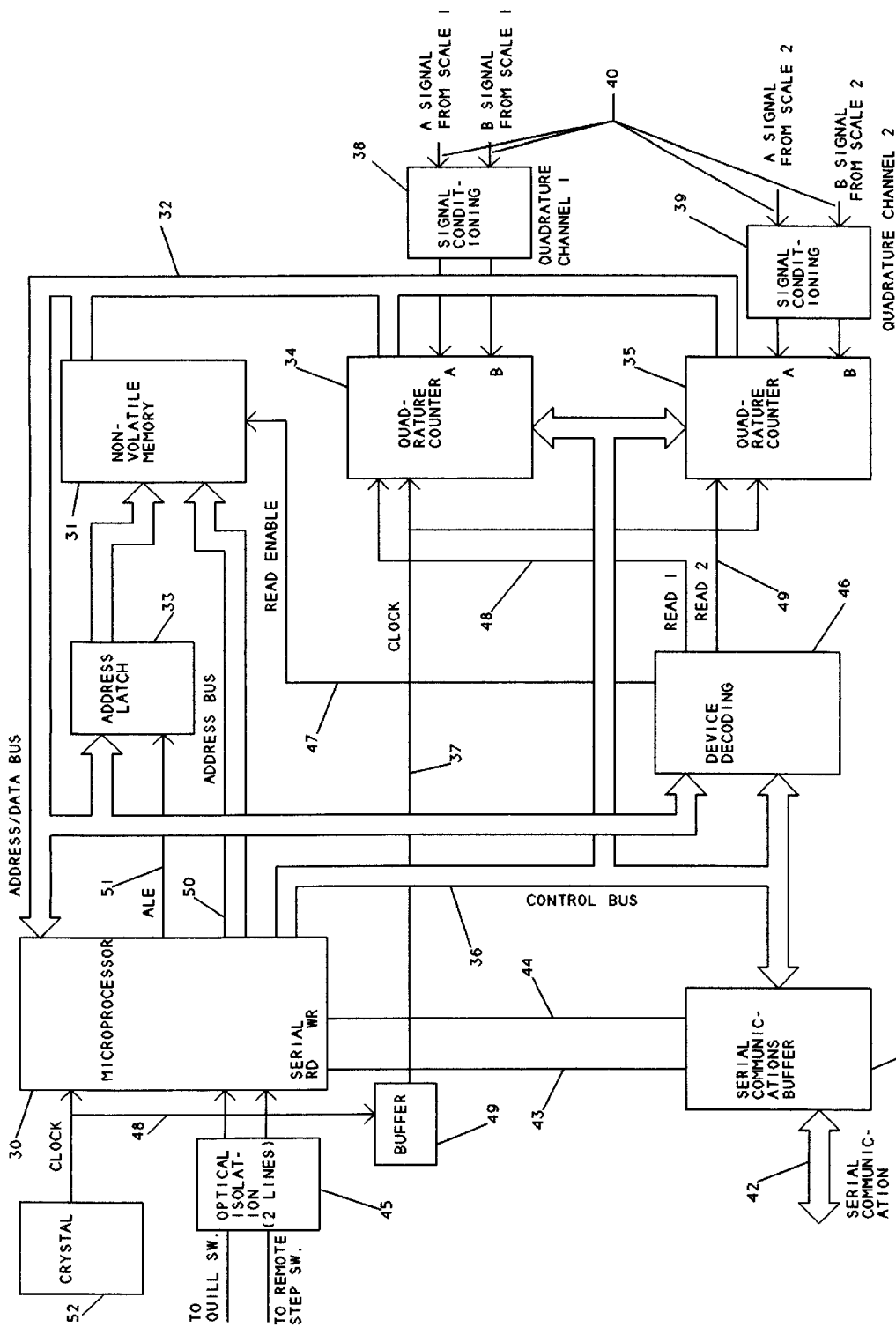

FIG. 4 shows a position sub-system hardware block diagram. The primary position sub-system hardware is implemented on a circuit board which is installed in cabinet 2 of FIG. 1 and provides the functions necessary to enable the computer, also installed in cabinet 2, to determine the current position of the milling machine table along the X and Y axes. A secondary position sub-system 21 of FIG. 1 provides the functions necessary to enable the computer to determine the current position of the milling machine table along the Z axis. The primary and optional secondary position sub-systems operate identically and their information is delivered identically to different serial ports of the computer in cabinet 2 of FIG. 1.

Referring to FIG. 4, there is shown a block diagram depicting the interconnections of the functional blocks of a position sub-system. Microprocessor 30 is supplied with a clock signal from crystal 52 over clock line 48. Clock line 48 also supplies buffer 49. Buffer 49 supplies clock signals to quadrature counters 34 and 35. Microprocessor 30 continuously executes the position sub-system program contained in non-volatile memory 31. Memory 31 is addressed with eight address lines 50 supplied directly from microprocessor 30 and eight address lines supplied from address latch 33. Address latch 33 is loaded from microprocessor 30 for each memory addressing cycle by eight lines 32 which are multiplexed for address information out or data information in. Microprocessor 30 coordinates the loading of address latch 33 through the ALE (address latch enable) signal 51. Program data from non-volatile memory 31 is supplied back to microprocessor 30 via the address/data bus 32 during a memory read cycle. The position sub-system program is executed by microprocessor 30 by reading instructions stored in non-volatile memory 31.

In the course of executing the position sub-system program, quadrature counters 34 and 35 are read over address/data bus 32. Each quadrature counter reads its signals 18 and 19 of FIG. 2 as input and forms a single 16 bit number internally. The monitoring of the signals 18 and 19 of FIG. 2 and the updating of the counter's internal 16 bit count goes on continuously and is not dependent on whether information is ever sent to the host computer. The 16 bit number contained in each quadrature counter 34 and 35 is periodically read in two successive 8 bit reads. The 8 bit data read from each counter is either the lower 8 bits or the upper 8 bits of the 16 bit number determined by the state of a control line in control bus 36, at the time of each reading. The 16 bits of count data from the quadrature counters 34 and 35 are transformed to 24 bits of data by the position sub-system program by counting the number of times the 16 bit data overflows or underflows. The resolution of the scale connected to the quadrature counter determines what physical distance is represented by each count. For example, if the scale resolution is 0.0001 inch per count then 24 bits can represent +/−838 inches of movement.

The quadrature counters 34 and 35 can be reset at any time by program control of the counter's reset line. The reset line for each counter is part of control bus 36. A low voltage level is necessary to perform the reset function. Reset forces the internal 16 bit count to zero. Each counter can be reset independently. The quadrature counters 34 and 35 are supplied with a buffered clock signal 37 which the circuit uses to counteract or filter signal noise which might be present on either of the signal lines 18 or 19 of FIG. 2. The signal filtering is not relevant to this discussion.

The signal conditioning blocks 38 and 39 provide for over or under voltage conditions at the position signal input points 40 which might inadvertently be applied during installation or maintenance of the equipment.

The serial communication buffer block 41 converts the external serial communication 42 signal levels of approximately plus or minus 12 volts to TTL logic levels needed at the microprocessor 30 serial input and output connections 43 and 44 respectively. Serial communication is used to communicate various information to or from the position sub-system.

The position sub-system accepts two external inputs which are optically isolated by optical isolation block 45. These inputs are wired to switches located directly on the machine tool and in the case of a milling machine are used to provide remote step activation and quill up/not-up position information.

The device decoding block 46 decodes addresses from the address/data bus 32 and the control bus 36 to generate read strobes 47, 48 and 49 for the non-volatile memory 31, and the quadrature counters 34 and 35 respectively.

Figure 5A:
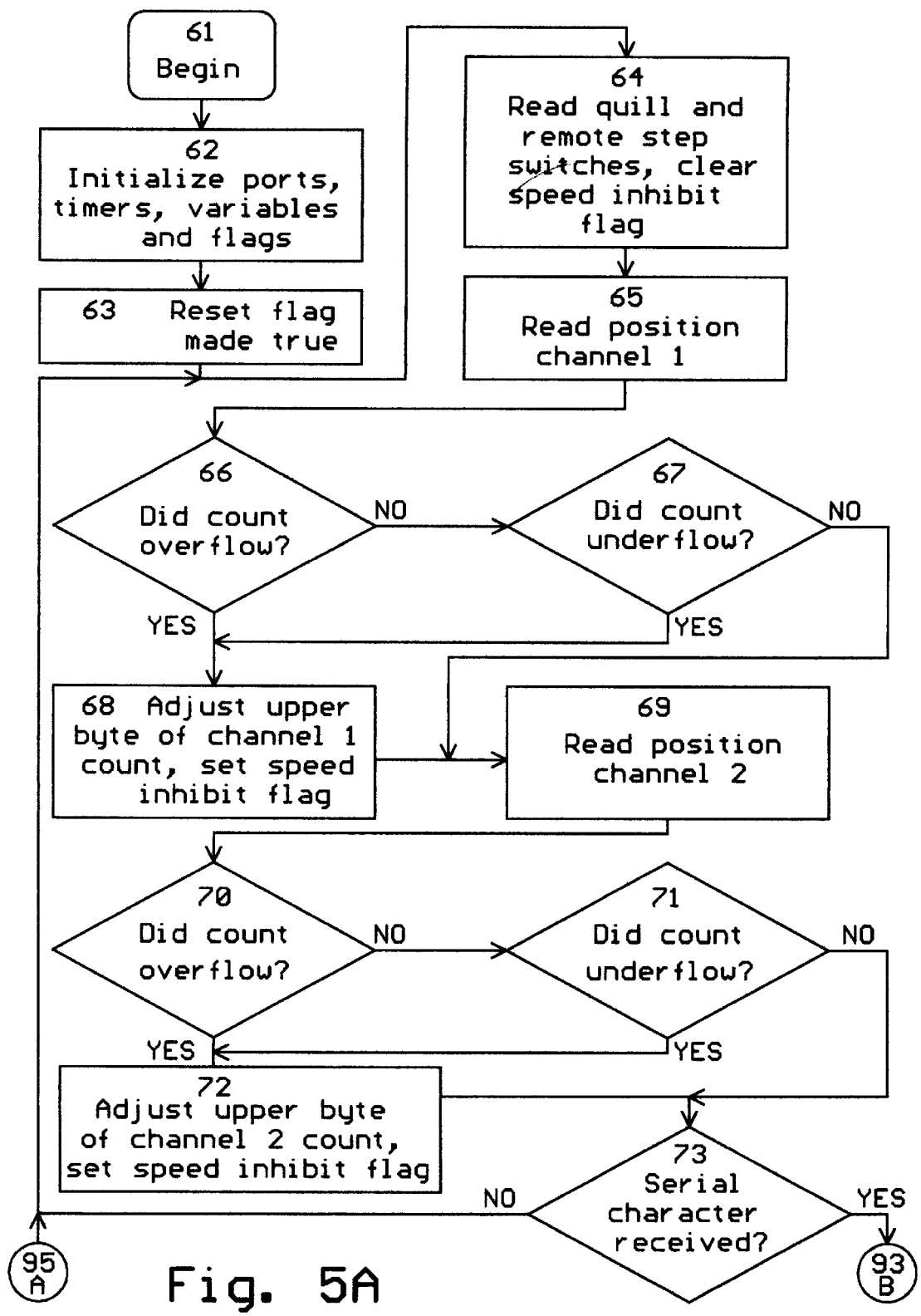
Figure 5B:
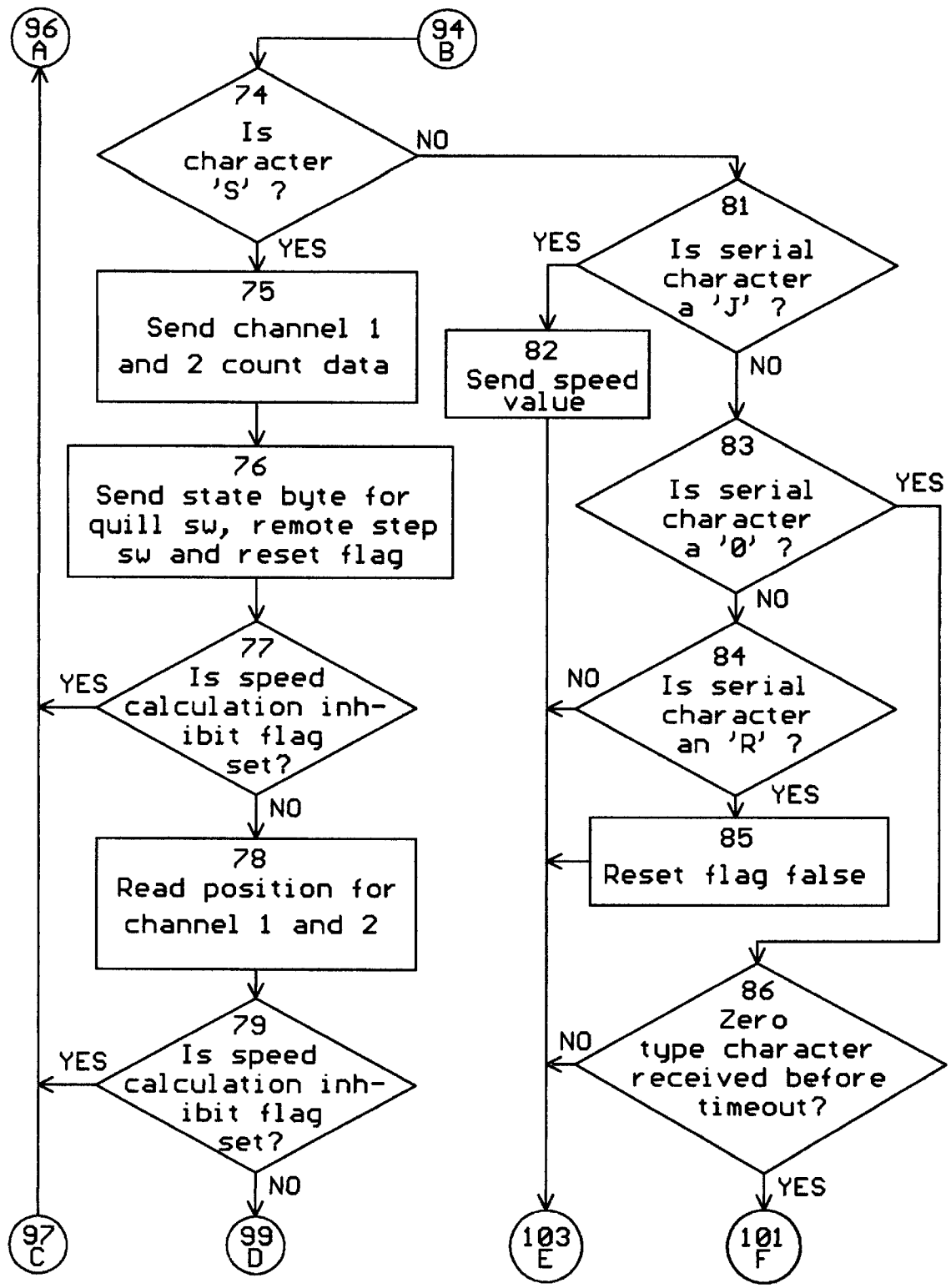
Figure 5C:
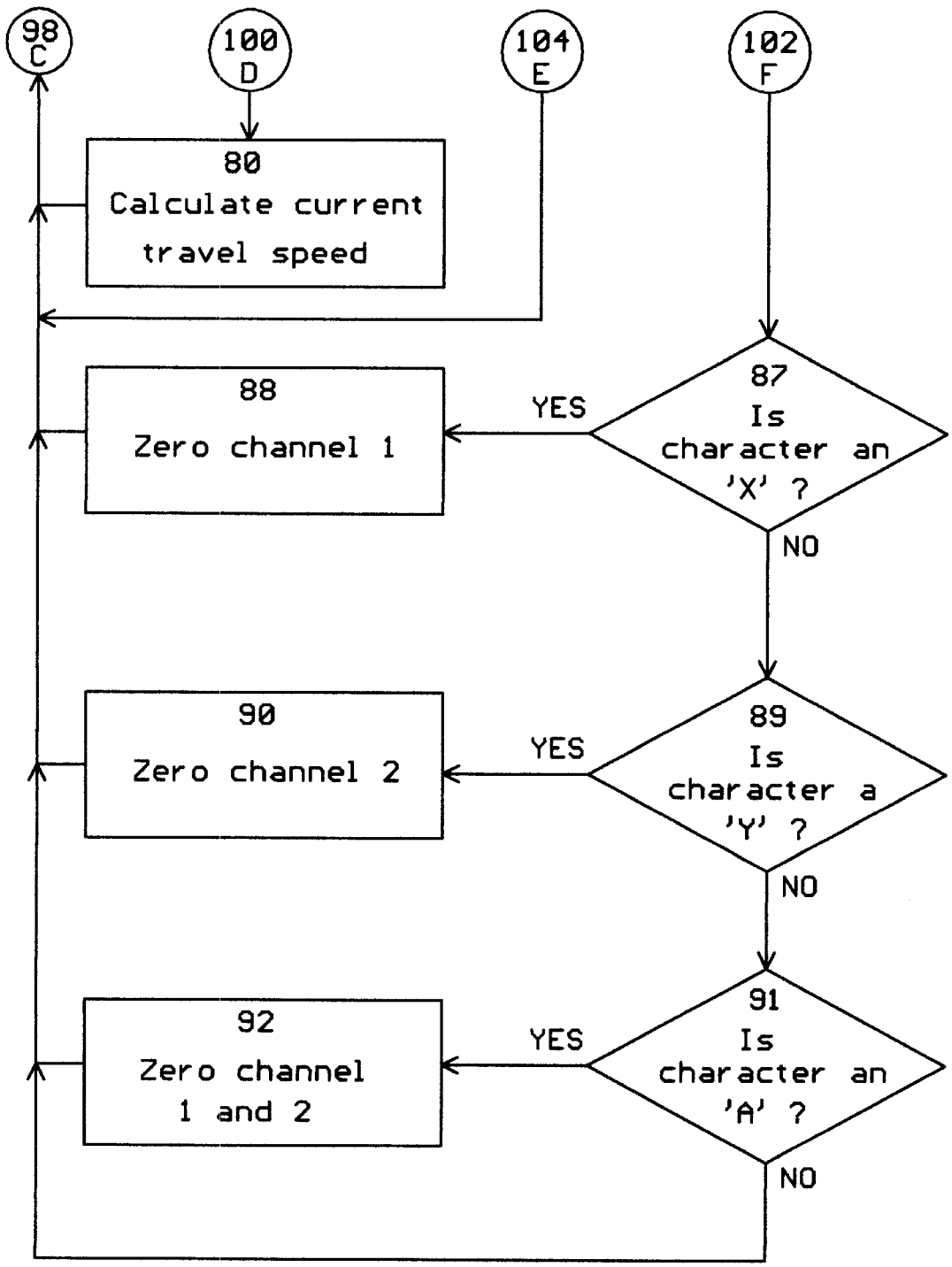

Referring to FIGS. 5A, 5B and 5C, a flow chart is shown describing the functions of the position sub-system. Note that each block of the flow chart has a reference number at the top. These numbers will be used in the discussion to follow. The position sub-system program begins at block 61 after power is applied and continues until power is removed. The initialization block 62 sets variables, flags, ports and timers to their startup values and conditions. A reset status flag is set true 63 so that the host computer is informed of the position sub-system reset status as being reset and not acknowledged by the host computer. The host computer expects the reset status flag to be true initially. The reset status flag will be set false 85 (FIG. 5B) by the position sub-system receiving an "R" command character 84 from the host computer. If power is removed and reapplied or if the position sub-system is caused to reset for any reason after the host computer has acknowledged the reset condition the reset status flag will again set true. Thus, if the host computer reads an unexpected reset status true condition an error process is initiated. The host computer will display a message to the operator indicating that the position information may be unreliable and must be checked.

After initialization the program starts a continuous loop which, in brief, does the following:

a. reads counters and switch status then update counter stores with current value b. checks for a command character at the serial port c. if a command character is found at serial port, process the command and continue the loop by continuing at "a" above.

d. if no command character is found at the serial port continue at "a" above.

In the FIG. 5A block diagram there are two quadrature counter channels named channel 1 and channel 2. Channels 1 and 2 normally correspond to machine axes X and Y respectively. However, if additional axes are required, a second position sub-system board supplies axes Z and S through the use of channels 1 and 2 respectively. Axis S, for Supplementary, is not used in the current embodiment but could be used for a second Z axis, say, to monitor a milling machine quill position and independently to monitor a milling machine knee position, if the machine is so configured. The S axis could also be used to read rotary information from an encoding rotary table or rotary indexing device. Each channel operates in the same manner so, for brevity, the channel 1 operation is described.

As previously described, the channel 1 counter will contain a 16 bit binary number resulting from the continuous monitoring of the counter A and B input signals. After reading the channel 1 count 65, the program must expand the count to a 24 bit binary number in order for the equipment to track position over an adequate distance range. Each time the 16 bit count is read, the value is saved as an old value. When the 16 bit count is read the next time, the old value and the current value are compared. If the upper four bits of the old value change from 1111 to 0000 in the new value, an overflow has occurred at block 66. Likewise, if the upper four bits of the old value change from 0000 to 1111 in the new value, an underflow has occurred at block 67. At block 68 eight bits copied from the upper eight bits of the 24 bit number are incremented when an overflow is detected and decremented when an underflow is detected. Otherwise, the upper eight bits of the 24 bit number are unchanged. The current 16 bit number is recombined with the 8 bits resulting from the underflow/overflow detection process to form the 24 bit number.

The position sub-system does not send any serial characters to its host except in response to a command message from the host. Commands may be one or more characters. The position sub-system checks to see if a character has been received at block 73. If no character is present the program continues the loop at block 64. If a character is received at block 73 a validity analysis will begin at block 74. The commands shown in the FIGS. 5A, 5B and 5C block diagram and the response they generate from the position sub-system are:

| | Command | Response |
|---|---|---|
| a. | S (Send) | See block 75. Numerical information is sent as ASCII (American Standard for Communication Information Interchange) characters, where each character represents four bits of binary data encoded in hexadecimal form (0–9, A–F). The characters representing the binary bit data are sent most significant first to least significant last. A serial message is returned consisting of ASCII bytes encoding binary bits as follows:<br>1. Channel 1 bits 23-20<br>2. Channel 1 bits 19-16<br>3. Channel 1 bits 15-12<br>4. Channel 1 bits 11-8<br>5. Channel 1 bits 7-4<br>6. Channel 1 bits 3-0<br>7. Channel 2 bits 23-20<br>8. Channel 2 bits 19-16 |

-continued

| | Command | Response |
|---|---|---|
| | | 9. Channel 2 bits 15-12 |
| | | 10. Channel 2 bits 11-8 |
| | | 11. Channel 2 bits 7-4 |
| | | 12. Channel 2 bits 3-0 |
| | | and at block 76 |
| | | 13. reset flag state, switch 2 state, switch 1 state |
| b. | J (Speed) | See block 81, 82. A serial message is returned consisting of ASCII bytes encoding binary bits as follows: |
| | | 1. Channel 1 Speed bits 7-4 |
| | | 2. Channel 1 Speed bits 3-0 |
| | | 3. Channel 2 Speed bits 7-4 |
| | | 4. Channel 2 Speed bits 3-0 |
| c. | 0X (Zero X) | See blocks 83, 86, 87 and 88. No message is returned. The position sub-system resets the channel 1 count to zero. |
| d. | 0Y (Zero Y) | See blocks 83, 86, 87, 89 and 90. No message is returned. The position sub-system resets the channel 2 count to zero. |
| e. | 0A (Zero All) | See blocks 83, 86, 87, 89, 91 and 92. No message is returned. The position sub-system resets the channel 1 and channel 2 counts to zero. |
| f. | R (Reset) | See blocks 84 and 85. No message is returned. The position sub-system resets its reset status flag false indicating that the host computer acknowledges a startup condition at the sub-system. Should the position sub-system be reset for any reason the reset flag will be asserted true and reported back to the host when response is made to the S command. |

The channel speed reported in response to the J command is an indication of the speed the milling table is moving in the corresponding axis. The reported values are a measure of the table speed in either direction for the associated channel. The speed is based on the change in position counter value during execution of a known sequence of instructions from one reading of the position counters to the next reading. A speed inhibit flag is set true if program execution is diverted from the execution path forming the time interval. This might occur, for example, if a position counter overflow occurred resulting in the need for more instructions to be executed than the typical loop. If the speed inhibit flag is set true the speed value is not calculated or updated. The speed inhibit flag is set false at the beginning of the main loop at block 64.

Operation of The Graphic Depiction Program

Fundamentals

The software is written in a specific language, compiled with a specific compiler and executed on specific hardware to embody the invention. However, the invention could be written in other languages and compiled with other compilers by one skilled in these arts. The resulting software could then be executed on other specific hardware with the same results. Thus, the specific computer configuration as well as the specific computer language used in the following description is not intended to limit the invention to these facilities. The computer, while employed in the invention embodiment, is not part of the invention.

The embodiment computer has the following characteristics:

a. A main processor board using an 80486 microprocessor configured to operate with PC 104 standard architecture and having video support for a color VGA flat panel display.

b. Four megabytes of general purpose random access memory c. A hard disk drive system with 500 megabytes of storage capability d. A flexible disk drive system using removable media with 1.44 megabyte storage capacity e. Two serial ports configurable to 9600 baud, one stop bit, no parity operation f. A disk operating system using MSDOS Version 6.22 g. A 16 color liquid crystal, flat panel, display system consisting of an array of individually controllable picture elements 640 horizontal by 480 vertical h. A 104 key keyboard i. A computer power supply The Graphic Depiction program starts by displaying the Command Mode screen shown in FIG. 6. This screen shows the major commands on a text line across the top of the screen. The commands are displayed on the system display with one of the letters in green and the remainder in white. The green colored letter indicates the key on the computer keyboard which is pressed to activate the command.

| Command | Reference number | Command activation letter in green |
|---|---|---|
| File | 120 | F |
| Mill | 121 | M |
| Color | 122 | C |
| Tool | 123 | T |
| View | 124 | V |
| Help | 125 | H |
| GRO | 126 | R |
| Quit | 127 | Q |

Figure 6:
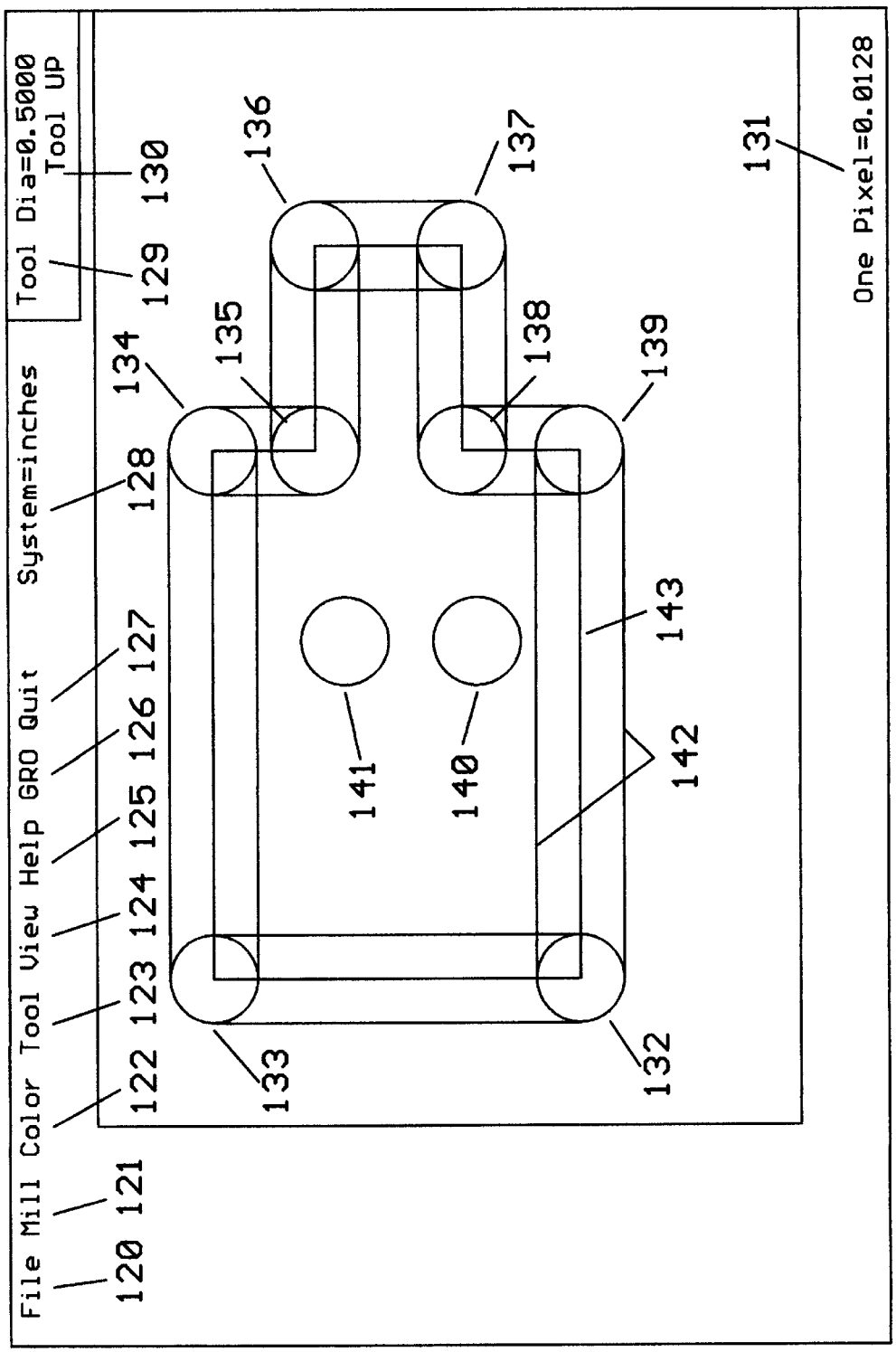

The current tool diameter 129 and up or down status information 130 is displayed in the upper right corner of the screen. The measurement system units 128 is shown in blue to the right of the commands. This message has the form "System=inches" or System=millimeters" depending on which of the supported measurement types is currently active. The "one pixel" message 131 in blue in the lower right corner of the screen shows the distance represented by one picture element for the current screen scaling factor. For example, this message has the form "One Pixel=0.0128" if the current screen scaling is 0.0128 units of the measurement system in use per pixel. This is the smallest movement that can be seen on the screen. The remainder of the screen is available for the graphic displays of machining requirements, hereafter called patterns. The pattern is made up from graphic elements including circles, lines, arcs and points in a scaled representation of machining operations. FIG. 6 shows an example pattern made up from drawing elements 132 through 143.

Command Mode Commands

Command mode is entered when the program first starts. This mode allows various setup conditions to be made prior to beginning the real time tool movement display (Milling mode) of FIG. 7A discussed later. The specific commands available in the Command mode are detailed below:

| | | |
|---|---|---|
| File | Item 120. | This command provides the general capability to specify which pattern file is to be loaded and displayed. A file can be specified by typing in its name or selected from a list of files in the current directory. The operator is provided with a means to change the current directory or indicate the file to be loaded by manipulating the location of a selection box which surrounds selection candidates. The selections are color coded such that directories are shown in yellow, pattern files are shown in blue and other files are shown in black. Only pattern files are loadable. |
| | | An alternative to loading a pattern file is provided for use when one wishes only to display on the screen the actual tool movements. The File command allows for setting a reference point, the minimum requirement needed for later entering Milling Mode. A reference point is established by providing the system with information about the physical distances from the reference point in the +X, −X, +Y and −Y directions to be represented on the display screen. The display screen is always linear. The screen scaling will be set so that all specified dimensions are on the screen and the defined area will be as large as possible consistent with the defined dimensions. A small magenta colored circle is drawn to show the position of the reference point. |
| | | The file command also provides access to sub-commands grouped under the Calibration heading. Calibration command descriptions appear in this section after the main Command mode items. |
| Mill | Item 121. | This command allows the operator to start the Milling Mode part of the program. The Milling Mode is used for dynamic presentation of machining according to the Computer Generated Graphic Depiction (CGGD) methods. |
| Color | Item 122. | This command allows the operator to select the color to be used to display a cutting tool in the down position when in Milling Mode. Therefore the area where material is removed will be represented with this color. |
| Tool | Item 123. | This command allows the operator to select the cutting tool size to be used for display in the Milling Mode. The selection can be made by entering the diameter in either inches or millimeters directly, or by selecting from a stored list of common inch and millimeter sizes. |
| View | Item 124. | This command allows the operator to move to the part of the program that is used for altering the pattern display and is known as View Mode. In View Mode the pattern display can be altered by combinations of horizontal or vertical displacement, larger or smaller size, and angular rotation. |
| Help | Item 125. | This command allows the operator to display context sensitive help information about the command mode and its commands. |
| GRO | Item 126. | This command allows the operator to change the Milling Mode display readout method. The GRO in the command line indicates that the system will be in Graphic Readout Mode if Milling Mode is entered. The alternate selection is DRO for digital readout if Milling Mode is entered. |
| Quit | Item 127. | This command allows the operator to quit this program and return to the program which started this program. |

Sub-commands of the File Command (Item 120)
  Calibration
  The File command provides access to a group of commands under the Calibration heading. Calibration provides the ability of the system to operate with different types and resolution measurement scales or encoders and to make use of the measurement inputs in different ways. The following Sub-commands under Calibration are described:

| | |
|---|---|
| Fixed | The fixed command (F) is used when setting-up an axis to use a fixed measurement scale or encoder where each measurement count represents a specific, predefined, fixed distance moved. After selecting "Fixed" and selecting the axis to which "Fixed" applies, the resolution number for the scale or encoder is entered. This value, typically expressed in micrometers, is entered and thereafter the axis absolute position is indicated by the resolution value times the number of movement counts received from the channel. |
| Variable | The variable command (V) is used when setting up an axis to use a variable measurement scale or encoder where the meaning of a measurement count (the resolution) must be specified prior to use. This is accomplished by physically moving the axis a known distance and then entering the distance moved. The entered value is divided by the number of counts generated by the movement and the result (the resolution) is saved. Thereafter the absolute position is indicated by the resolution value times the number of movement counts received from the channel. |
| Reverse | The reverse command (R) is used when setting up a measurement axis and the resultant movement indication is the reverse of the actual movement. This is a convenience feature since scales or encoders can be mounted in various ways that may result in reverse indications. Rather than rewiring or |

| | |
|---|---|
| | remounting scales or encoders the reversal is done by the computer program when necessary. |
| Scaling | The scaling command (S) is used to temporarily set the system so that any measurement count information is multiplied by the scaling factor selected as part of this command. The end result allows parts to be made which are scaled while using information from a full size pattern file. Scaling, in this embodiment, is provided in the range 10% (1/10th scale) to 1000% (10 times scale) and applies to all measurement axes. |
| Axis | The axis command (A) allows the system to be set for the number of axes equipped. In this embodiment 2 or 3 axes are allowed. |

With the use of the File command a pattern file is selected. Referring to FIG. 6, the details of a particular pattern file are shown as it would appear on the display screen in Command mode. Circle 132 shows the starting tool diameter at the starting position. Likewise, circles 133 through 139 show the tool diameter at the end points of subsequent steps. The pattern display lines which tangentially connect the edge of a circle to another, as illustrated typically by lines 142, symbolically define the outer edge of the tool path as the tool moves from circle 132 through 139 then back to circle 132. Lines connecting the center of one circle to the center of another, as illustrated typically by line 143, show the symbolic tool center path as it moves from circle 132 through 139 then back to circle 132. When step positions are shown with edge 142 and center 143 connecting lines the positions are connected, indicating that the defined tool should be in a cutting position when moving from one step position to the next. The circles at 140 and 141 are isolated features of the pattern. The lack of connecting lines indicates that the movement to these feature locations is made with the defined tool in a non-cutting position. Some information, such as tool type, is not contained in the pattern display. Tool type and other information can be provided in comments associated with step line text. Referring to the example of a simple pattern, on Page 16, the comment on step line 3 (text after the semicolon character) indicates a milling cut with depth of cut to be 0.25 inches. When in Milling Mode, comments on step lines are written to the display screen when the associated step is reached.

Figure 7A:
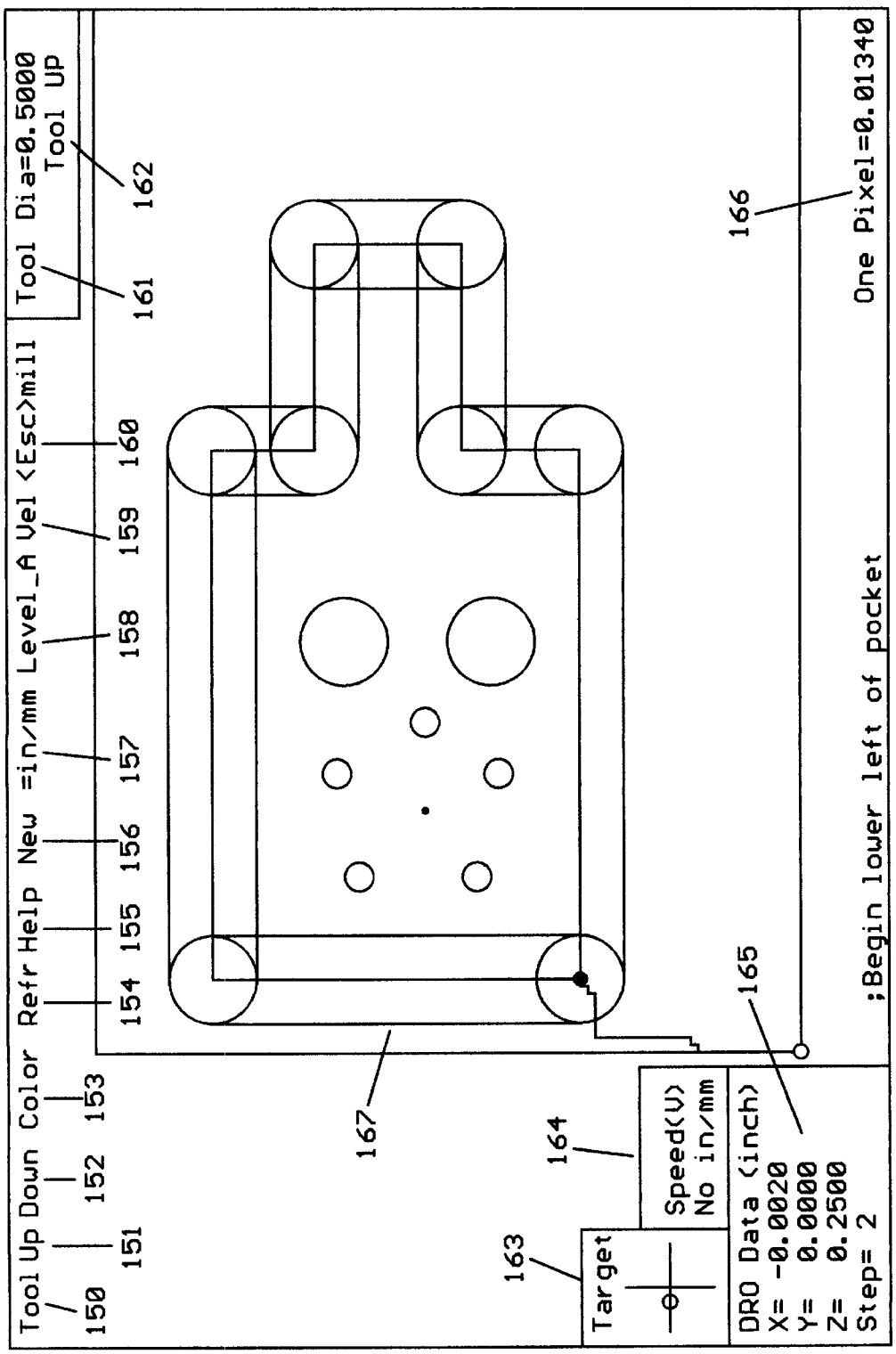
Figure 8A:
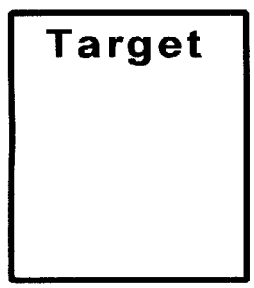

FIG. 7A. shows the Milling Mode screen. Operation in Milling Mode is where the dynamic display of machining operations takes place. This screen shows the major commands on a text line across the top of the screen 150 through 160. The commands are shown with one of the letters in green and the remainder in white. The green colored letter indicates the key on the computer keyboard which is pressed to activate the command. The current tool diameter 161 and up or down status information 162 is displayed in the upper right corner of the screen. The one pixel message 166 in blue in the lower right corner of the screen shows the distance represented by one picture element for the current screen scaling factor. For Example, this message has the form "One Pixel=0.0128" when the current screen scaling is 0.0128 units of the measurement system in use per pixel. In the lower left corner of the screen is an assembly of three information boxes, a Target Box 163, a Speed Box 164 and a DRO Box 165. Referring to FIG. 8A, the Target Box is blank, except for the word Target, when the distance from the current tool center position to the current target position is greater than 0.01 inches on either or both the X or Y axis.

Figure 7B:
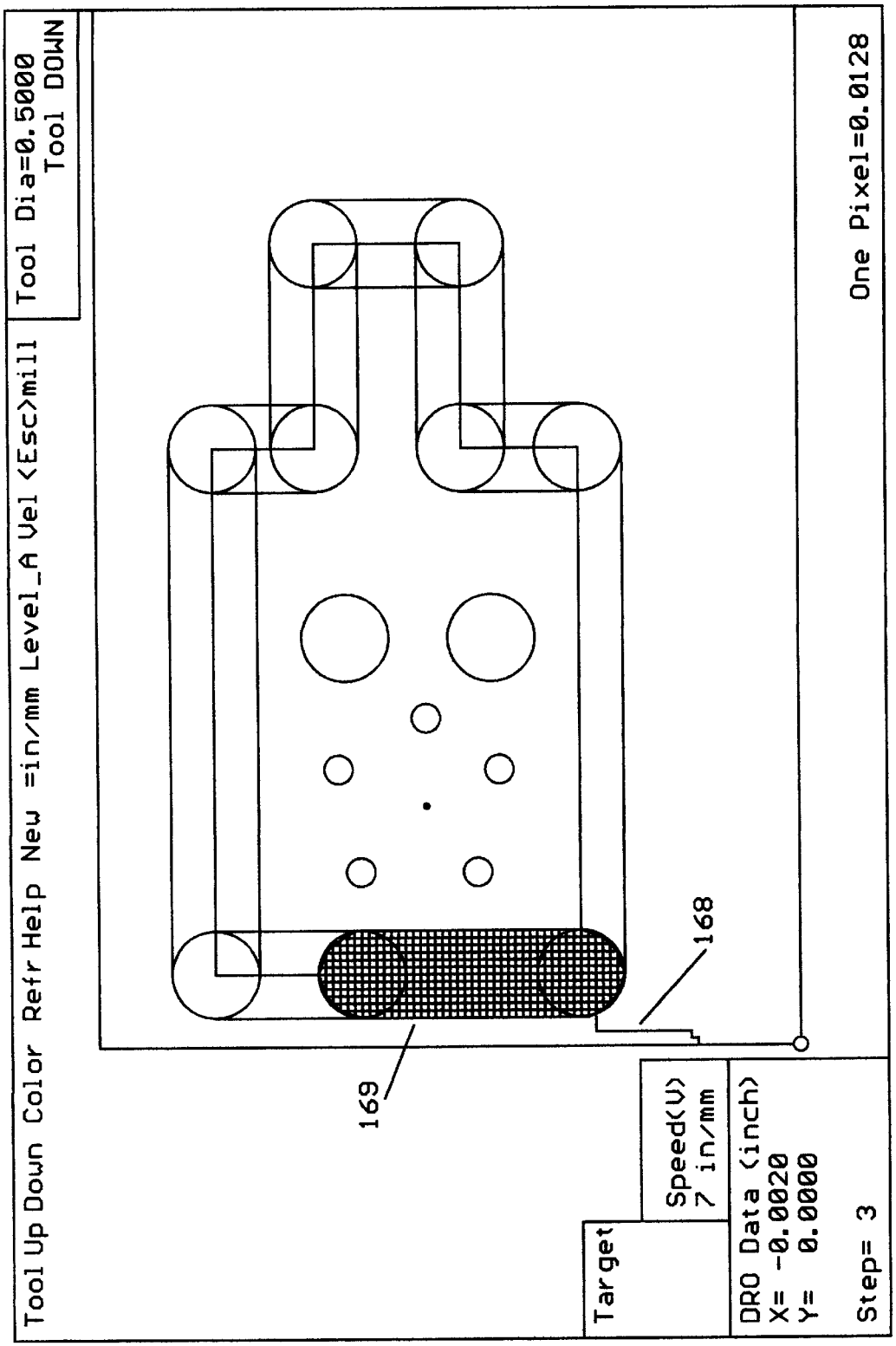

With the tool in the up, or non-cutting position, moving the tool leaves a white line that indicates the tool path, 168 in FIG. 7B. With the tool in the down, or cutting position, movement of the tool causes the machined area to be shown as a colored area. This area is shown shaded, 169 in FIG. 7B. This allows the operator to see the progress of the machining operations.

Figure 8B:
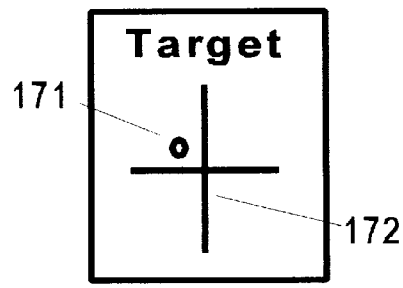
Figure 8C:
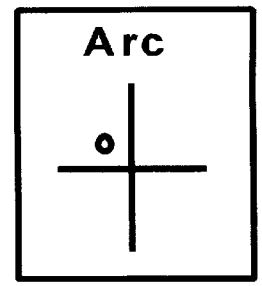
Figure 8D:
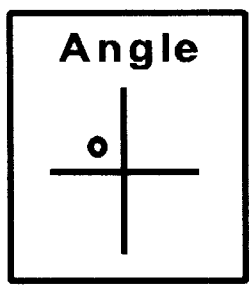

Referring to FIG. 8B, when the current tool center position is within 0.01 inches of the current target position on both the X and Y axes a cross-hair style target 172 representation is displayed. The X and Y axis cross-hair lines 172 stay fixed and their cross point represents the current target position. A small four pixel wide circle 171 is dynamically shown relative to the cross-hair lines to represent the current position of the tool center relative to the target point. This presentation gives the operator an intermediate accuracy positioning method between the larger pattern display and the digital position display. Referring to FIG. 8C an Arc Target display is presented when following an arc curve. Referring to FIG. 8D an Angle Target is presented when following an angular pattern connection. For both the arc and angle target displays the cross-hair intersection point represents the closest point on the arc or angle to the current tool center point. Thus, unlike the target cross-hair intersection point 172 that represents a fixed physical point, the arc and angle cross-hair intersection point represents a point on the arc or angle line that moves as the tool is repositioned. The arc and angle target display thus enables the operator to monitor the error in following the arc or angle line while both X and Y axes are moved.

Figure 9:
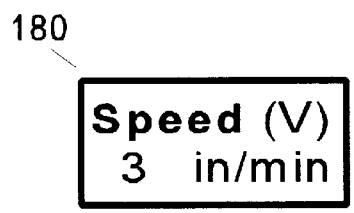
Figure 10:
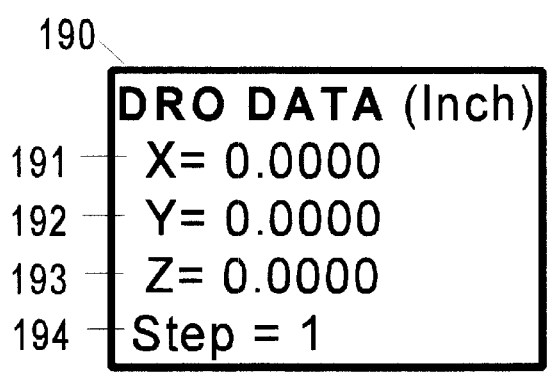

Referring to FIG. 9, the Speed Box 180 , if the Speed feature is enabled, shows the unsigned larger value of X or Y axis repositioning movement. That is, both X and Y movement speeds are calculated and the larger is displayed. The value is shown as inches per minute or centimeters per minute depending on the current measurement system in use. Speed is typically used to allow the operator to manually determine a proper feed speed and use that number to set an axis power feed device to the same feed rate. Referring to FIG. 10, the DRO Box is used to display the current measurement units in use 190, the digital values of the current tool center position relative to the target for each axis independently 191, 192, and 193 and the current machining step number 194 associated with the machining information file data. The remainder of the screen is available for the graphic displays of machining requirements and dynamic machining depictions. The pattern is made up from graphic elements including circles, lines, arcs and dots in a scaled representation of machining operations.

Simulation of Machining Operations

This embodiment provides for a Simulation Mode of operation. Simulation or Real Mode is selected prior to starting the milling program and the mode selected is effective until termination. This feature allows the Graphic Depiction program to operate on a computer with or without any position information hardware. The Simulation Mode allows the user to learn about the operation of the milling program without necessarily being at the machining site. Additionally, pattern files created for machining purposes can be tested for mistakes, inappropriate sequences, and other features without the need to occupy the machining site or cut material. Operating the program in Simulation Mode mimics real operations with the following exceptions:

a. X and Y axis tool movement is accomplished by pressing the keyboard cursor arrow keys. Movement occurs in the direction indicated by the keyboard key arrow. For example, the right arrow key moves the tool to the right relative to the pattern.

b. Z axis tool movement is accomplished by pressing the keyboard Page-Up or Page-Down key. Movement occurs in the direction indicated by the keyboard key. For example, the Page-Up key moves the tool up relative to the pattern.

c. The Speed feature, normally used to read the mill table speed in the X or Y axis direction, is disabled. The Speed Box is used to show how much movement is simulated för each direction control key pressed. The "f" and "s" keyboard keys, for "faster" and "slower" respectively, are used to control the simulated movement value per movement key keystroke. The simulated movement value per keystroke is shown in the Speed Box.

d. The simulated movement is automatically changed to 0.001" per movement key keystroke when the tool center is within 0.010" of the current target position, i.e. when the Target Box is active.

e. Any features which inherently require real position input are disabled. The calibration features "Variable Scale Setup" and "Scaling" require real position input.

Milling Mode Commands

Milling mode is the mode where dynamic displays are generated showing tool movement and machining progress relative to the work.

| | |
|---|---|
| Tool | See FIG. 7A item 150. This command allows the operator to select the cutting tool size to be used for display in the Milling Mode. The selection can be made by entering the diameter in either inches or millimeters directly or selecting from a stored list of common inch and millimeter sizes. |
| Up | See FIG. 7A item 151. This command allows the operator to change the dynamic tool display to the "tool up" status where tool center position is shown as a single pixel white dot. |
| Down | See FIG. 7A item 152. This command allows the operator to change the dynamic tool display to the "tool down" status where tool position is shown as a scaled color filled circular area centered at the current tool position relative to the machining requirements display. The tool down mode is used when a tool movement path is expected to cause work material cutting. |
| Color | See FIG. 7A item 153. This command allows the operator to select the color to be used to display a cutting tool and machining traces when in Milling Mode. |
| Refr | See FIG. 7A item 154. This command, Refresh, is used to rewrite the pattern display and other screen information displays whenever the operator chooses. Refresh is occasionally needed because tool down movements overwrite machining requirements and other screen information on the display screen and may need to be recalled. The visual effect is to bring the pattern display to a forward position over any tool movement information which may be present on the screen. |
| Help | See FIG. 7A item 155. This command allows the operator to display context sensitive help information about the milling mode and its commands. |
| New | See FIG. 7A item 156. This command combines three functions. One of the three functions is selected by pressing a second key after the first N key. The function New Position (NP keys pressed in succession) allows the operator to change the tool position relative to the pattern display. This is typically required if the workpiece is repositioned relative to the tool as may happen if the workpiece unintentionally moves because of inadequate attachment to the table or is rotated or repositioned intentionally to facilitate operations. The ability to independently reposition the absolute X, Y or Z axis to zero and the ability to reposition the X and Y axes to any step point is provided. The function New New (NN keys pressed in succession) allows the operator to clear all milling traces, rewrite the pattern and reset the step number to 1. The position of the tool relative to the pattern is not changed. This function is typically used after completion of one workpiece and starting work on another workpiece of the same type. The function New Clear (NC keys pressed in succession) allows the operator to clear all machining traces from the screen. This function is typically used when existing machining traces are no longer needed and are possibly causing unnecessary clutter on the screen. |
| =in/mm | See FIG. 7A item 157. This command (pressing the key) allows the operator to conveniently switch measurement systems between inch based and metric based values. All digitally displayed distance information including tool diameter, table speed, X, Y and Z positions and the one pixel distance are converted and redisplayed using the new measurement system numbers. |
| Level_A/ Level_B | See FIG. 7A item 158. This command allows the operator to switch patterns while maintaining the beginning pattern. The current tool trace information and current tool position of the beginning pattern are stored in memory for recall at a later time. A second pattern is loaded, displayed and utilized using the same procedures as were used with the first pattern. When the second pattern, Level_B is complete, the operator may return to the beginning pattern. Upon returning from the second pattern the current tool position is correct relative to |

-continued

| | |
|---|---|
| Vel | the beginning pattern and, optionally, a scaled outline of the secondary pattern is superimposed on the beginning screen. This capability is typically used to facilitate the reuse of common groups of machining details or "libraries". By using Level A and one or more Level B patterns, patterns consisting of large numbers of machining steps (greater than 99) can be accommodated. |
| Vel | See FIG. 7A item 159. This command, Velocity, allows the operator to selectively turn the Speed feature, described above, on or off The default setting is off. This feature is disabled when the milling program is operated in Simulation Mode. |
| <Esc>mill | See FIG. 7A item 160. This command allows the operator to end the milling mode and return to Command Mode. The pattern and machining traces are retained on screen and can be reused if Milling Mode is again entered provided external functions that require their removal are not used. |

Milling Mode Operation Using Graphic Depiction

The Milling Mode part of the program provides the operational capability of the system and to which all other parts and programs act to support. Before attempting to operate the program in Milling Mode there must be a pattern file loaded or a reference point established as previously described. Initialization of the Milling Mode software is done first and writes the screen shown in FIG. 7A including the pattern 167 selected in Command Mode, the Milling Mode command line 150 through 160, the tool information box 161 and 162, the pixel size information 166, and the Target 163, Speed 164 and DRO 165 boxes. The machining step number is written in the DRO box and will be initialized to 1 when started. If the Milling Mode is exited and reentered the step number remains unchanged. After initialization, the milling mode software executes a continuous loop consisting of the following general functions:

a. Check Keyboard buffer for detection of a keyboard key pressed.

b. If key pressed, get character and check for a command key.

c. If a command key, process the command. Some commands cause functions to be performed and return to the main loop without the need for further operator action. An example is the refresh command Refr. Other commands require additional operator information to be supplied or choices to be made before the operational loop continues.

d. Get absolute position data. The current counts for each axis are retrieved from the position sub-system. The counts are converted to calibrated inches and millimeters and change flags are set if the current numbers are different from the last reading. The states of two optional external switches are read and change flags set if the switch state is different than the last reading. The change flags allow for faster operation by detecting the fact that there is no need to perform actions associated with the flag. For example, if the x, y and z axis change flags are not set and the remote switch flags are not set there will be no need to update the tool trace screen display, the target box, or any of the DRO box numbers.

e. Check status of Speed feature (disabled in Simulation Mode).

f. If Speed feature is enabled get speed data from the position sub-system, weight average, calibrate and display the value. The displayed value is the unsigned larger value from the X or Y axis.

g. Check reset status of the position sub-system(s). This is done in Real Mode only.

h. If the position sub-system(s) report "reset status" true than display an operator warning message reporting an unexpected position sub-system reset and the need to check position accuracy. Wait for operator acknowledgement, then clear the position sub-system reset flag.

i. Process and display the digital position numbers in the DRO box.

j. Check for new external switch states. This is done in Real Mode only.

k. If external step switch changed from "off" to "on" set the step flag so step position is changed later in the loop.

If external quill switch changed from "off" to "on" set tool up state and write tool up to display.

If external quill switch changed from "on" to "off" set tool down state and write tool down to display.

l. Check for any flag indicating a need to update the display.

m. If there is no new information to write to the display then begin the loop cycle at the beginning.

n. If there is new information to write to the display, calculate the new screen position of the tool center from the known distance from the absolute reference point, the screen scaling factor and the screen position of the absolute reference point. Screen position does not imply that the point is physically locatable on the screen but means a position on a virtual viewing plane, some portion of which corresponds to physical pixel positions on the real screen. Write the tool up or tool down display, depending on the current state of the tool, centered at the calculated screen position.

o. Check step flag for the need to change step.

p. If there is no step flag indication bypass the step change process. If a step is indicated the old step target is removed and replaced with the new step target indication, clear any old step message from the screen and write any new step message, if the new step position is not connected to the last step position draw a target location line between the two step positions and clear the step flag.

q. Check for both X and Y distance from target less than 0.01 inches.

r. When both X and Y distance from target is less than 0.01 inches, write the Target cross-hair display and show tool center position as a small circle relative to the cross-hair lines.

s. Check for conditions which indicate the Arc Target should be displayed. When a user steps to an arc line a calculation is done each pass through the operational loop to:

a. determine whether the tool center position is outside the step point target position range of .010 inch b. determine whether the tool center position is within the arc target range If conditions a and b are true the arc target will be displayed. The arc target display shows the tool center position relative to the nearest point on the arc line. A cross-hair target display is used to indicate the current nearest point to the arc. Unlike the step point target which represents a fixed point on the work, the arc target represents a movable point defined by the x and y tool center position relation to the desired tool path center arc line. The nearest point on the arc line is always the intersection of the arc line and a straight line starting at the arc center and extending through the current tool center position. By displaying a continuously updated indication of the tool center relative to the closest point on the arc an operator can easily control both axes to maintain a tool position close to the specified arc line. To help the operator identify which arc is the one associated with the arc target display the arc center line is changed to a different (yellow) color. The yellow arc center line continues to indicate the current arc even when stepping continues past the arc provided another arc information line is not encountered. Once another arc information line is encountered while stepping, the yellow arc center line is removed from the previous arc and applied to the new current arc center line. The arc target display will be maintained, once activated, provided the arc target range is not exceeded even though step position changes occur. Thus, the operator may continue the arc cut and examine other step positions.

t. Check for conditions which indicate the angle target should be displayed. When the current step point is the end of an angle cut (either before or after the current step point) and the tool position is within the angle target boundaries and not closer than 0.01" to the step target point, the angle target display is activated. The display is similar to the arc target display in that the display shows the error to the nearest point on the angle line. The nearest point on the angle line is always the intersection of the angle line and a straight line perpendicular to the angle line extending through the current tool center position. By displaying a continuously updated indication of the tool center relative to the closest point on the angle line an operator can easily control both axes to maintain a tool position close to the specified angle line. The angle target display will be maintained, once activated, provided the angle target range is not exceeded even though step position changes occur. Thus the operator may continue the angle cut and examine other step positions.

u. Check for a true tool change flag. The tool change flag is set if a step change occurred and a different size tool was indicated. If the tool change flag is set, a warning message is sent to the operator. The operator must acknowledge the message before the system proceeds. The operator must assure the machine tool is physically equipped with the tool size indicated. The operator may press the Enter key to have the system tool size updated to the size required or may press the Escape key to leave the system tool size unchanged.

v. Loop to the beginning of the Milling Mode loop.

By continuously looping through the above sequence the computer generated equivalent of real tool cutting actions are symbolically produced on the screen. Within the screen resolution, a faithful record of the cutting tool motion is thereby produced relative to the pattern display. The operator may visually use the symbolic display for tool positioning and, if the tool display remains at least one pixel away from relevant pattern lines, is guaranteed to not overcut any programmed dimension. The ability to rely on the symbolic display reduces the time needed to perform roughing operations (cutting operations not intended to intersect the final cut position) such as clearing the interior of a pocket. When, for example, a pocket has a complex exterior shape and one or more areas within the pocket which are not to be cut, the visual cutting process dramatically reduces both the time required to perform the operation and the probability of making an overcut error. For finishing or trim cuts the visual display reduces errors by presenting the required tool movements in a more natural way than can be done with digital position indications only. The ability to continuously monitor arc and angle cut error while performing these cuts, through the use of Arc and Angle Target displays, adds significant utility to the manually operated machine tool by providing cut information not available previously.

Conclusions, Ramifications and Scope

The use of the above described CGGD methods applied to a machine tool, in particular a manually operated milling machine, allows for faster, more accurate, and less costly processing of stock raw material into finished machined parts. More detailed information is provided to allow operators with less experience to produce high quality work. Arc and diagonal cut features are provided that allow for manual tracing of curves and diagonal cuts with greater ease and accuracy than previously possible.

Other Applications

The availability of X, Y and possibly Z axis positioning information from scales or encoders on other machines would allow for similar operational improvements. Machines such as drill presses, jig bores, and horizontal boring machines require the accurate positioning of a tool from place to place and could directly apply the CGGD methods and preferred embodiment equipment.

Figure 11:
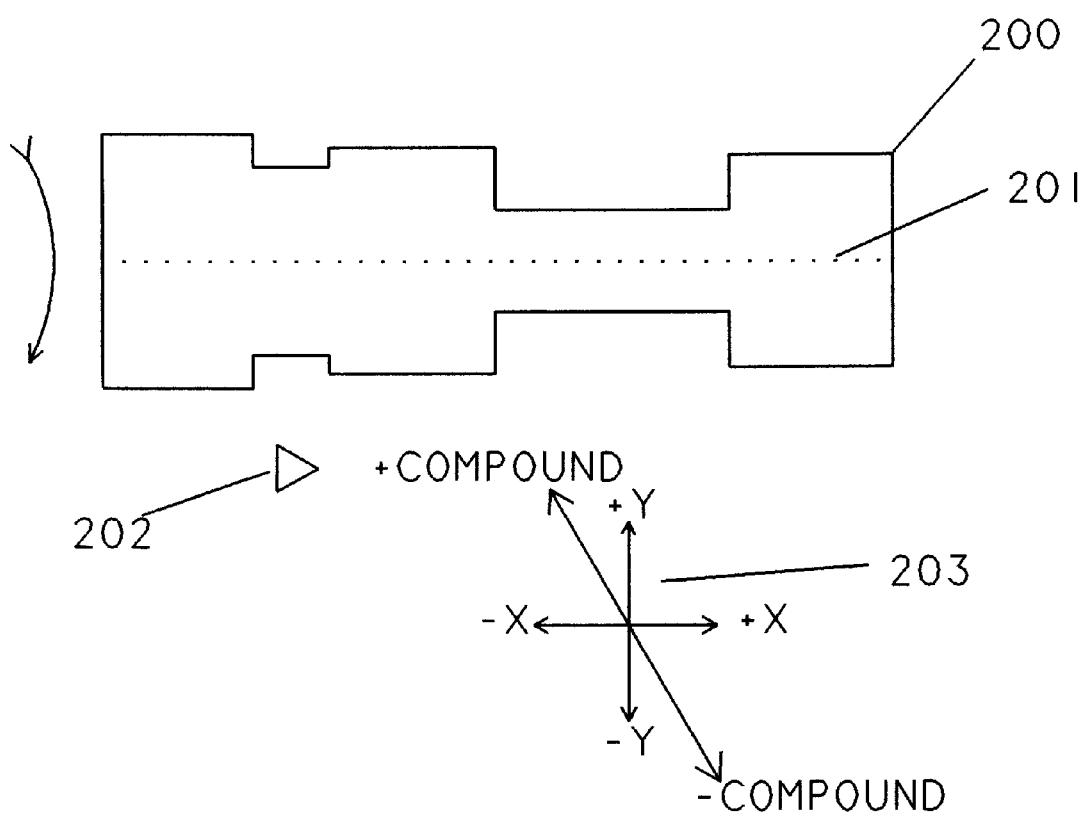
Figure 12:
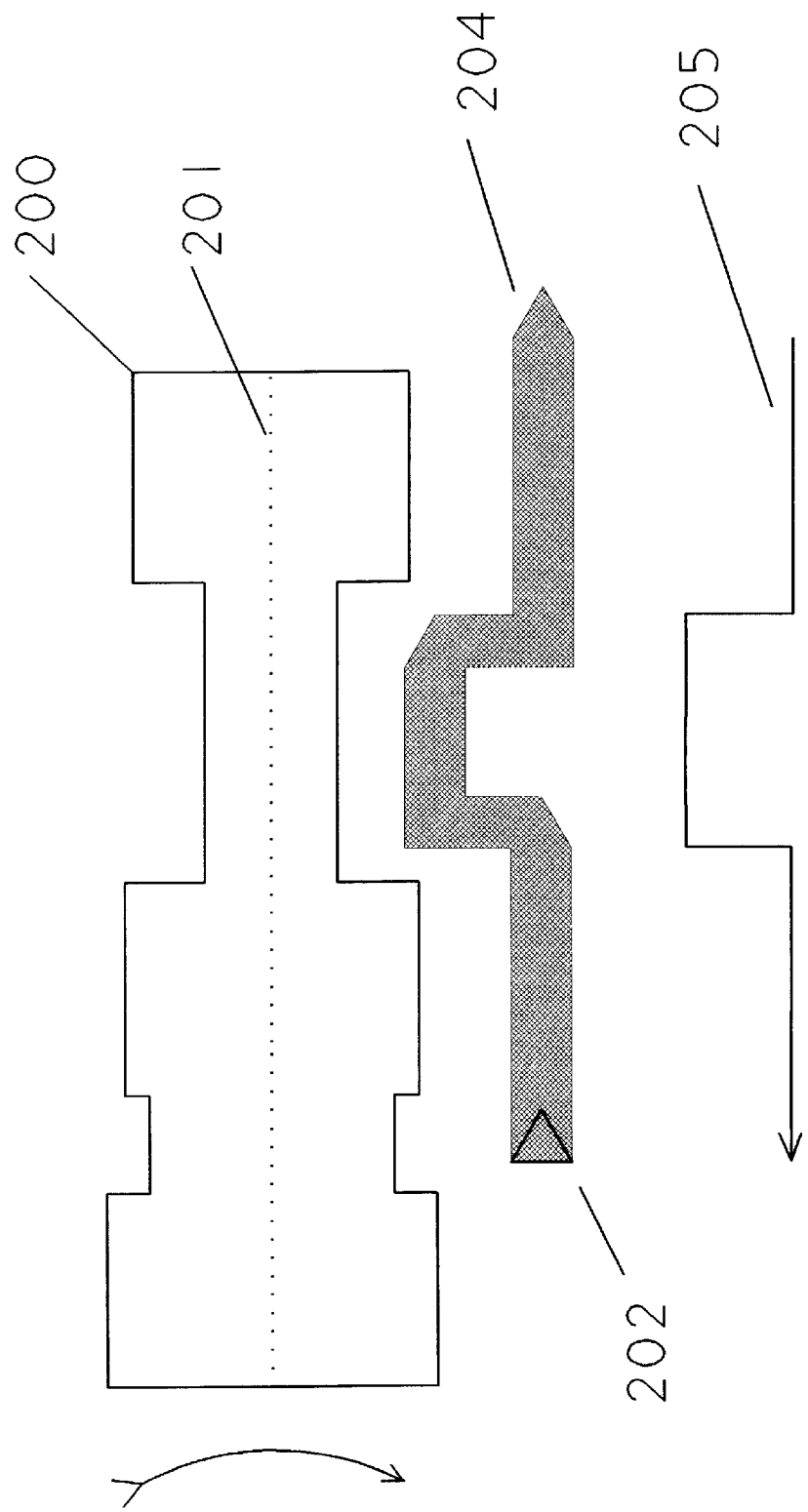

The methods described can be applied to the metal lathe machine tool in a similar fashion with the addition of non-circular tool geometry and a redefinition of the third (Z) axis. Referring to FIG. 11, a typical cylindrical lathe produced part, viewed from above with the X-Y plane oriented horizontally as indicated 203, is shown. A typical lathe machine tool is also equipped with a compound feed arrangement 203 which moves the cutting tool 202 in a user set direction relative to the X-Y plane. The position of cutting tool 202 is determined by the X and Y position, and the compound angle setting and movement. The cutting action of a lathe tool is normally applied to a rotating workpiece 200 at an X-Y cross section point. The stock rotates about the center of turning 201. The cutting tool shape, a triangle in the depiction of FIGS. 11 and 12, must be geometrically defined and a reference point established. By moving a geometrically defined tool shape representation on a display, the X-Y cross section display of a lathe part can be used to guide the machine tool operator in a way very similar the milling machine application. The part machining requirements can be described in the same manner to produce a machining requirements display. Referring to FIG. 12, the lathe produced part machining requirements 200 turned about center of rotation 201 is shown. When the tool is moved according to the reference path 205 (not containing any compound movement, and displaced downward, for clarity), the resulting material removed is shown as 204. The tool end position is shown at 202.

Program Listing

The object code for the embodiment program is contained in a microfiche appendix consisting of two frames.

What is claimed is:

1. An apparatus for guiding the operation of a manual machine tool for machining a workpiece with a cutting tool by presenting machining requirements, on a graphical display, in pictorial form and combining said presentation with a superimposed graphic representation of the current and past positions of said cutting tool, such that said display shows pictorially the tool motion relative to said workpiece relative to said requirements, comprising:

(a) said graphic display device comprised of an array of controllable picture elements (b) a memory means to retain program instructions and parameters (c) a computer comprised of a processing unit, memory and interconnecting means for controlling said graphic display (d) a means for measuring the position of said cutting tool relative to said workpiece to be shaped in a plurality of axes, (e) a plurality of program instructions for the purpose of combining said machining requirements and said cutting tool position indications into said graphic representations, (f) a means of data entry for said machining requirements whereby a manual machine operator can rapidly, visually machine material to approximate said machining requirements prior to final machining using said graphic presentation, and whereby said operator can use said graphic presentation to machine material to satisfy final machining requirements, (g) said display means includes a target comprised of a means for identifying the target position and a means for indicating the current tool position relative to the target whereby the tool position indication relative to the target represents the error while following a curved or angle tool path machining requirement and, whereby a machine tool operator can use said target presentation to accurately follow a curved or angle tool path machining requirement.

2. The apparatus of claim 1 in which the machining requirements presentation can be altered by enlargement, reduction, rotation and displacement without altering the relative positions of pattern features and whereby a machine tool operator can make such alterations to suit a variety of machining conditions.

3. The apparatus of claim 1 in which a plurality of machining requirements displays may be used where a first machining requirements display acts as a base pattern and other machining requirements displays may be substituted so that machining operations may be performed on each substitute pattern, returning to the base pattern when complete, and the patterns are related spatially by the current step target point of the base pattern and the reference point of the substitute pattern.

4. The apparatus of claim 1 which further comprises means to alter the relationship between physical movement of a cutting tool relative to a workpiece and the indicated movement on the graphic and numerical display of machining, whereby the operator can perform scale modeling or shrinkage/expansion compensation on a workpiece without altering the original machining requirements details.

* * * * *